(12) United States Patent
Danesh et al.

(10) Patent No.: US 10,488,000 B2
(45) Date of Patent: Nov. 26, 2019

(54) THIN PROFILE SURFACE MOUNT LIGHTING APPARATUS

(71) Applicant: DMF, Inc., Carson, CA (US)

(72) Inventors: Michael D. Danesh, Carson, CA (US);
Vincent Williams, Torrance, CA (US);
Mark Jongewaard, Westminster, CO (US)

(73) Assignee: DMF, INC., Carson, CA (US)

( * ) Notice: Subject to any disclaimer, the term of this patent is extended or adjusted under 35 U.S.C. 154(b) by 0 days.

(21) Appl. No.: 16/016,040

(22) Filed: Jun. 22, 2018

(65) Prior Publication Data

US 2018/0372284 A1 Dec. 27, 2018

Related U.S. Application Data

(63) Continuation-in-part of application No. 29/648,046, filed on May 17, 2018.
(Continued)

(51) Int. Cl.
*F21S 8/04* (2006.01)
*F21S 8/00* (2006.01)
(Continued)

(52) U.S. Cl.
CPC ........... *F21S 8/043* (2013.01); *F21K 9/68* (2016.08); *F21S 8/026* (2013.01); *F21S 8/03* (2013.01);
(Continued)

(58) Field of Classification Search
CPC ..... F21S 8/043; F21S 8/26; F21S 8/03; F21K 9/68; F21V 21/088
See application file for complete search history.

(56) References Cited

U.S. PATENT DOCUMENTS 1,471,340 A 10/1923 Knight
2,038,784 A 4/1936 Ghadiali
(Continued)

FOREIGN PATENT DOCUMENTS

CA 2243934 C 6/2002
CA 2502637 A1 9/2005
(Continued)

OTHER PUBLICATIONS

International Search Report and Written Opinion in International Patent Application No. PCT/US18/39048 dated Dec. 14, 2018. 24 pages.
(Continued)

*Primary Examiner* — Anne M Hines
(74) *Attorney, Agent, or Firm* — Smith Baluch LLP

(57) ABSTRACT

A thin profile surface mount LED lighting apparatus includes a housing, an LED board including multiple uniformly distributed LEDs, and a lens. The lens has a back side facing the LED board and a front side that provides a downward facing surface when the LED lighting apparatus is installed in an opening of a ceiling. The lens is disposed with respect to the LED board such that the LEDs illuminate the back side of the lens. A first spacing of the LEDs causes resulting light from the downward facing surface of the lens to be substantially uniform during operation of the apparatus. In one example, a thin front edge of a sidewall of the housing, forming a perimeter around the lens, is flush with the lens and is appreciably thin (e.g., a thickness of less than three millimeters), and a depth of the sidewall housing is less than one inch.

30 Claims, 24 Drawing Sheets

Related U.S. Application Data

(60) Provisional application No. 62/552,126, filed on Aug. 30, 2017, provisional application No. 62/523,640, filed on Jun. 22, 2017.

(51) Int. Cl.
*F21V 21/088* (2006.01)
*F21K 9/68* (2016.01)
*F21S 8/02* (2006.01)
*F21Y 115/10* (2016.01)

(52) U.S. Cl.
CPC ......... *F21V 21/088* (2013.01); *F21Y 2115/10* (2016.08)

(56) References Cited

U.S. PATENT DOCUMENTS

| | | |
|---|---|---|
| 2,197,737 A | 4/1940 | Appleton |
| 2,528,989 A | 11/1950 | Ammells |
| 2,642,246 A | 6/1953 | Larry |
| 2,670,919 A | 3/1954 | Vincent |
| D180,844 S | 8/1957 | Poliakoff |
| 3,023,920 A | 3/1962 | Cook et al. |
| 3,422,261 A | 1/1969 | McGinty |
| 3,460,299 A | 8/1969 | Wilson |
| 3,650,046 A | 3/1972 | Skinner |
| 3,711,053 A | 1/1973 | Drake |
| D227,989 S | 7/1973 | Geisel |
| 3,812,342 A | 5/1974 | Mcnamara |
| D245,905 S | 9/1977 | Taylor |
| 4,088,827 A | 5/1978 | Kohaut |
| 4,154,218 A | 5/1979 | Hulet |
| 4,176,758 A | 12/1979 | Glick |
| 4,280,169 A | 7/1981 | Allen |
| 4,399,497 A | 8/1983 | Druffel |
| 4,520,435 A | 5/1985 | Baldwin |
| 4,601,145 A | 7/1986 | Wilcox |
| 4,723,747 A | 2/1988 | Karp et al. |
| 4,729,080 A | 3/1988 | Fremont et al. |
| 4,754,377 A | 6/1988 | Wenman |
| 4,930,054 A | 5/1990 | Krebs |
| 5,216,203 A | 6/1993 | Gower |
| 5,239,132 A | 8/1993 | Bartow |
| 5,250,269 A | 10/1993 | Langer et al. |
| 5,266,050 A | 11/1993 | O'Neil et al. |
| 5,382,752 A | 1/1995 | Reyhan et al. |
| 5,465,199 A | 11/1995 | Bray et al. |
| 5,505,419 A | 4/1996 | Gabrius |
| 5,544,870 A | 8/1996 | Kelly et al. |
| 5,562,343 A | 10/1996 | Chan et al. |
| 5,571,993 A | 11/1996 | Jones et al. |
| 5,580,158 A | 12/1996 | Aubrey et al. |
| 5,588,737 A | 12/1996 | Kusmer |
| 5,603,424 A | 2/1997 | Bordwell et al. |
| 5,613,338 A | 3/1997 | Esposito |
| D381,111 S | 7/1997 | Lecluze |
| 5,662,413 A | 9/1997 | Akiyama et al. |
| D386,277 S | 11/1997 | Lecluze |
| D387,466 S | 12/1997 | Lecluze |
| 5,738,436 A | 4/1998 | Cummings et al. |
| 5,836,678 A | 11/1998 | Wright et al. |
| 5,942,726 A | 8/1999 | Reiker |
| 5,944,412 A | 9/1999 | Janos et al. |
| 5,957,573 A | 9/1999 | Wedekind et al. |
| 5,975,323 A | 11/1999 | Turan |
| 6,082,878 A | 7/2000 | Doubek et al. |
| 6,105,334 A | 8/2000 | Monson et al. |
| 6,161,910 A | 12/2000 | Reisenauer et al. |
| 6,170,685 B1 | 1/2001 | Currier |
| 6,174,076 B1 | 1/2001 | Petrakis et al. |
| 6,176,599 B1 | 1/2001 | Farzen |
| 6,267,491 B1 | 7/2001 | Parrigin |
| 6,332,597 B1 | 12/2001 | Korcz et al. |
| 6,350,043 B1 | 2/2002 | Gloisten |
| 6,364,511 B1 | 4/2002 | Cohen |
| 6,402,112 B1 | 6/2002 | Thomas et al. |
| D461,455 S | 8/2002 | Forbes |
| 6,461,016 B1 | 10/2002 | Jamison et al. |
| 6,474,846 B1 | 11/2002 | Kelmelis et al. |
| 6,491,413 B1 | 12/2002 | Benesohn |
| D468,697 S | 1/2003 | Straub, Jr. |
| 6,515,313 B1 | 2/2003 | Ibbetson et al. |
| 6,583,573 B2 | 6/2003 | Bierman |
| 6,585,389 B2 | 7/2003 | Bonazzi |
| 6,600,175 B1 | 7/2003 | Baretz et al. |
| D478,872 S | 8/2003 | Heggem |
| 6,657,236 B1 | 12/2003 | Thibeault et al. |
| 6,666,419 B1 | 12/2003 | Vrame |
| D488,583 S | 4/2004 | Benghozi |
| 6,719,438 B2 | 4/2004 | Sevack et al. |
| 6,758,578 B1 | 7/2004 | Chou |
| 6,777,615 B1 | 8/2004 | Gretz |
| 6,827,229 B2 | 12/2004 | Dinh et al. |
| 6,906,352 B2 | 6/2005 | Edmond et al. |
| D509,314 S | 9/2005 | Rashidi |
| 6,948,829 B2 | 9/2005 | Verdes et al. |
| 6,958,497 B2 | 10/2005 | Emerson et al. |
| 6,964,501 B2 | 11/2005 | Ryan |
| D516,235 S | 2/2006 | Rashidi |
| 7,064,269 B2 | 6/2006 | Smith |
| D528,673 S | 9/2006 | Maxik et al. |
| D531,740 S | 11/2006 | Maxik |
| D532,532 S | 11/2006 | Maxik |
| 7,148,420 B1 | 12/2006 | Johnson et al. |
| 7,154,040 B1 | 12/2006 | Tompkins |
| 7,170,015 B1 | 1/2007 | Roesch et al. |
| D536,349 S | 2/2007 | Humber et al. |
| D537,039 S | 2/2007 | Pincek |
| D539,229 S | 3/2007 | Murphey |
| 7,186,008 B2 | 3/2007 | Patti |
| 7,190,126 B1 | 3/2007 | Paton |
| 7,211,833 B2 | 5/2007 | Slater, Jr. et al. |
| 7,213,940 B1 | 5/2007 | Van De Ven et al. |
| D547,889 S | 7/2007 | Huang |
| D552,969 S | 10/2007 | Bobrowski et al. |
| D553,267 S | 10/2007 | Yuen |
| D555,106 S | 11/2007 | Pape et al. |
| D556,144 S | 11/2007 | Dinh |
| 7,297,870 B1 | 11/2007 | Sartini |
| 7,312,474 B2 | 12/2007 | Emerson et al. |
| 7,320,536 B2 | 1/2008 | Petrakis et al. |
| D561,372 S | 2/2008 | Yan |
| D561,373 S | 2/2008 | Yan |
| 7,335,920 B2 | 2/2008 | Denbaars et al. |
| D563,896 S | 3/2008 | Greenslate |
| 7,347,580 B2 | 3/2008 | Blackman et al. |
| D570,012 S | 5/2008 | Huang |
| 7,374,308 B2 | 5/2008 | Sevack et al. |
| D570,504 S | 6/2008 | Maxik et al. |
| D570,505 S | 6/2008 | Maxik et al. |
| 7,399,104 B2 | 7/2008 | Rappaport |
| D578,677 S | 10/2008 | Huang |
| 7,431,482 B1 | 10/2008 | Morgan et al. |
| 7,432,440 B2 | 10/2008 | Hull et al. |
| 7,442,883 B2 | 10/2008 | Jolly et al. |
| 7,446,345 B2 | 11/2008 | Emerson et al. |
| 7,473,005 B2 | 1/2009 | O'Brien |
| 7,488,097 B2 | 2/2009 | Reisenauer et al. |
| 7,494,258 B2 | 2/2009 | McNaught |
| 7,503,145 B2 | 3/2009 | Newbold et al. |
| 7,524,089 B2 | 4/2009 | Park |
| D591,894 S | 5/2009 | Flank |
| 7,534,989 B2 | 5/2009 | Suehara et al. |
| D596,154 S | 7/2009 | Rivkin |
| 7,566,154 B2 | 7/2009 | Gloisten et al. |
| D599,040 S | 8/2009 | Alexander et al. |
| D600,836 S | 9/2009 | Hanley et al. |
| 7,588,359 B2 | 9/2009 | Coushaine et al. |
| 7,592,583 B2 | 9/2009 | Page et al. |
| D606,696 S | 12/2009 | Chen et al. |
| 7,625,105 B1 | 12/2009 | Johnson |
| 7,628,513 B2 | 12/2009 | Chiu |
| 7,651,238 B2 | 1/2010 | O'Brien |

(56) References Cited

U.S. PATENT DOCUMENTS

| | | |
|---|---|---|
| 7,654,705 B2 | 2/2010 | Czech et al. |
| D611,650 S | 3/2010 | Broekhoff |
| 7,670,021 B2 | 3/2010 | Chou |
| 7,673,841 B2 | 3/2010 | Wronski |
| 7,677,766 B2 | 3/2010 | Boyer |
| 7,692,182 B2 | 4/2010 | Bergmann et al. |
| 7,704,763 B2 | 4/2010 | Fujii et al. |
| D616,118 S | 5/2010 | Thomas et al. |
| 7,722,208 B1 | 5/2010 | Dupre et al. |
| 7,722,227 B2 | 5/2010 | Zhang et al. |
| 7,735,795 B2 | 6/2010 | Wronski |
| 7,735,798 B2 | 6/2010 | Kojima |
| 7,748,887 B2 | 7/2010 | Zampini, II et al. |
| 7,766,518 B2 | 8/2010 | Piepgras et al. |
| 7,769,192 B2 | 8/2010 | Takagi et al. |
| 7,771,082 B2 | 8/2010 | Peng |
| 7,771,094 B2 | 8/2010 | Goode |
| D624,692 S | 9/2010 | Mackin et al. |
| D625,847 S | 10/2010 | Maglica |
| D625,876 S | 10/2010 | Chen et al. |
| D627,727 S | 11/2010 | Alexander et al. |
| 7,828,465 B2 | 11/2010 | Roberge et al. |
| D629,366 S | 12/2010 | Ericson et al. |
| 7,871,184 B2 | 1/2011 | Peng |
| 7,874,539 B2 | 1/2011 | Wright et al. |
| 7,874,709 B1 | 1/2011 | Beadle |
| D633,224 S | 2/2011 | Lee |
| D636,903 S | 4/2011 | Torenbeek |
| D637,339 S | 5/2011 | Hasan et al. |
| D637,340 S | 5/2011 | Hasan et al. |
| 7,950,832 B2 | 5/2011 | Tanaka et al. |
| D639,499 S | 6/2011 | Choi et al. |
| D640,819 S | 6/2011 | Pan |
| 7,959,332 B2 | 6/2011 | Tickner et al. |
| 7,967,480 B2 | 6/2011 | Pickard et al. |
| D642,317 S | 7/2011 | Rashidi |
| 7,972,035 B2 | 7/2011 | Boyer |
| 7,972,043 B2 | 7/2011 | Schutte |
| D642,536 S | 8/2011 | Robinson |
| D643,970 S | 8/2011 | Kim et al. |
| D646,011 S | 9/2011 | Rashidi |
| 8,013,243 B2 | 9/2011 | Korcz et al. |
| 8,038,113 B2 | 10/2011 | Fryzek et al. |
| D648,476 S | 11/2011 | Choi et al. |
| D648,477 S | 11/2011 | Kim et al. |
| D650,115 S | 12/2011 | Kim et al. |
| 8,070,328 B1 | 12/2011 | Knoble et al. |
| 8,096,670 B2 | 1/2012 | Trott |
| D654,205 S | 2/2012 | Rashidi |
| D656,263 S | 3/2012 | Ogawa et al. |
| 8,142,057 B2 | 3/2012 | Roos et al. |
| 8,152,334 B2 | 4/2012 | Krogman |
| D658,788 S | 5/2012 | Dudik et al. |
| D658,802 S | 5/2012 | Chen |
| D659,862 S | 5/2012 | Tsai |
| D659,879 S | 5/2012 | Rashidi |
| D660,814 S | 5/2012 | Wilson |
| 8,182,116 B2 | 5/2012 | Zhang et al. |
| 8,201,968 B2 | 6/2012 | Maxik et al. |
| D663,058 S | 7/2012 | Pan |
| D663,466 S | 7/2012 | Rashidi |
| D664,274 S | 7/2012 | de Visser et al. |
| D664,705 S | 7/2012 | Kong et al. |
| 8,215,805 B2 | 7/2012 | Cogliano et al. |
| 8,220,970 B1 | 7/2012 | Khazi et al. |
| 8,226,270 B2 | 7/2012 | Yamamoto et al. |
| 8,238,050 B2 | 8/2012 | Minano et al. |
| 8,240,630 B2 | 8/2012 | Wronski |
| D667,155 S | 9/2012 | Rashidi |
| 8,262,255 B1 | 9/2012 | Rashidi |
| D668,372 S | 10/2012 | Renshaw et al. |
| D668,809 S | 10/2012 | Rashidi |
| D669,198 S | 10/2012 | Qui |
| D669,199 S | 10/2012 | Chuang |
| D669,620 S | 10/2012 | Rashidi |
| 8,277,090 B2 | 10/2012 | Fryzek et al. |
| 8,308,322 B2 | 11/2012 | Santiago et al. |
| D673,869 S | 1/2013 | Yu |
| D676,263 S | 2/2013 | Birke |
| D676,814 S | 2/2013 | Paul |
| 8,376,593 B2 | 2/2013 | Bazydola et al. |
| D677,417 S | 3/2013 | Rashidi |
| D677,634 S | 3/2013 | Korcz et al. |
| D679,047 S | 3/2013 | Tickner et al. |
| 8,403,533 B1 | 3/2013 | Paulsel |
| 8,403,541 B1 | 3/2013 | Rashidi |
| D681,259 S | 4/2013 | Kong |
| 8,408,759 B1 | 4/2013 | Rashidi |
| D682,459 S | 5/2013 | Gordin et al. |
| D683,063 S | 5/2013 | Lopez et al. |
| D683,890 S | 6/2013 | Lopez et al. |
| D684,269 S | 6/2013 | Wang et al. |
| D684,719 S | 6/2013 | Rashidi |
| D685,118 S | 6/2013 | Rashidi |
| D685,120 S | 6/2013 | Rashidi |
| 8,454,204 B1 | 6/2013 | Chang et al. |
| D685,507 S | 7/2013 | Sun |
| D687,586 S | 8/2013 | Rashidi |
| D687,587 S | 8/2013 | Rashidi |
| D687,588 S | 8/2013 | Rashidi |
| D687,980 S | 8/2013 | Gravely et al. |
| D688,405 S | 8/2013 | Kim et al. |
| D690,049 S | 9/2013 | Rashidi |
| D690,864 S | 10/2013 | Rashidi |
| D690,865 S | 10/2013 | Rashidi |
| D690,866 S | 10/2013 | Rashidi |
| D691,314 S | 10/2013 | Rashidi |
| D691,315 S | 10/2013 | Samson |
| D691,763 S | 10/2013 | Hand et al. |
| 8,550,669 B2 | 10/2013 | Macwan et al. |
| D693,043 S | 11/2013 | Schmalfuss et al. |
| D693,517 S | 11/2013 | Davis |
| D694,456 S | 11/2013 | Rowlette, Jr. et al. |
| 8,573,816 B2 | 11/2013 | Negley et al. |
| D695,441 S | 12/2013 | Lui et al. |
| D696,446 S | 12/2013 | Huh |
| D696,447 S | 12/2013 | Huh |
| D696,448 S | 12/2013 | Huh |
| 8,602,601 B2 | 12/2013 | Khazi et al. |
| D698,067 S | 1/2014 | Rashidi |
| D698,068 S | 1/2014 | Rashidi |
| 8,622,361 B2 | 1/2014 | Wronski |
| D698,985 S | 2/2014 | Lopez et al. |
| D699,384 S | 2/2014 | Rashidi |
| D699,687 S | 2/2014 | Baldwin et al. |
| D700,387 S | 2/2014 | Snell |
| 8,641,243 B1 | 2/2014 | Rashidi |
| 8,659,034 B2 | 2/2014 | Baretz et al. |
| D701,175 S | 3/2014 | Baldwin et al. |
| D701,466 S | 3/2014 | Clifford et al. |
| 8,672,518 B2 | 3/2014 | Boomgaarden et al. |
| D702,867 S | 4/2014 | Kim et al. |
| D703,843 S | 4/2014 | Cheng |
| 8,684,569 B2 | 4/2014 | Pickard et al. |
| D705,472 S | 5/2014 | Huh |
| 8,727,582 B2 | 5/2014 | Brown et al. |
| D708,381 S | 7/2014 | Rashidi |
| 8,777,449 B2 | 7/2014 | Ven et al. |
| D710,529 S | 8/2014 | Lopez et al. |
| 8,801,217 B2 | 8/2014 | Oehle et al. |
| 8,820,985 B1 | 9/2014 | Tam et al. |
| 8,833,013 B2 | 9/2014 | Harman |
| D714,989 S | 10/2014 | Rowlette, Jr. et al. |
| 8,870,426 B2 | 10/2014 | Biebl et al. |
| 8,888,332 B2 | 11/2014 | Martis et al. |
| 8,890,414 B2 | 11/2014 | Rowlette, Jr. et al. |
| D721,845 S | 1/2015 | Lui et al. |
| 8,939,418 B2 | 1/2015 | Green et al. |
| D722,296 S | 2/2015 | Taylor |
| D722,977 S | 2/2015 | Hagarty |
| D722,978 S | 2/2015 | Hagarty |
| 8,950,898 B2 | 2/2015 | Catalano |
| D726,363 S | 4/2015 | Danesh |
| D726,949 S | 4/2015 | Redfern |

(56) References Cited

U.S. PATENT DOCUMENTS

| | | |
|---|---|---|
| 9,004,435 B2 | 4/2015 | Wronski |
| 9,039,254 B2 | 5/2015 | Danesh |
| D731,689 S | 6/2015 | Bernard et al. |
| 9,062,866 B1 | 6/2015 | Christ et al. |
| 9,065,264 B2 | 6/2015 | Cooper et al. |
| 9,068,719 B2 | 6/2015 | Van De Ven et al. |
| D734,525 S | 7/2015 | Gordin et al. |
| D735,012 S | 7/2015 | Cowie |
| D735,142 S | 7/2015 | Hagarty |
| 9,078,299 B2 | 7/2015 | Ashdown |
| 9,109,760 B2 | 8/2015 | Shum et al. |
| D739,590 S | 9/2015 | Redfern |
| 9,140,441 B2 | 9/2015 | Goelz et al. |
| D742,325 S | 10/2015 | Leung |
| 9,151,457 B2 | 10/2015 | Pickard et al. |
| 9,151,477 B2 | 10/2015 | Pickard et al. |
| 9,217,560 B2 | 12/2015 | Harbers et al. |
| 9,222,661 B2 | 12/2015 | Kim et al. |
| 9,239,131 B1 | 1/2016 | Wronski et al. |
| 9,285,103 B2 | 3/2016 | Van De Ven et al. |
| 9,291,319 B2 | 3/2016 | Kathawate et al. |
| 9,301,362 B2 | 3/2016 | Dohn et al. |
| D754,078 S | 4/2016 | Baldwin et al. |
| D754,079 S | 4/2016 | Baldwin et al. |
| D754,605 S | 4/2016 | McMillan |
| 9,303,812 B2 | 4/2016 | Green et al. |
| 9,310,038 B2 | 4/2016 | Athalye |
| 9,310,052 B1 | 4/2016 | Shum |
| 9,322,543 B2 | 4/2016 | Hussell et al. |
| 9,347,655 B2 | 5/2016 | Boomgaarden et al. |
| 9,360,190 B1 | 6/2016 | Shum et al. |
| 9,366,418 B2 | 6/2016 | Gifford |
| 9,371,966 B2 | 6/2016 | Rowlette, Jr. et al. |
| D762,181 S | 7/2016 | Lin |
| 9,395,051 B2 | 7/2016 | Hussell et al. |
| D762,906 S | 8/2016 | Jeswani et al. |
| D764,079 S | 8/2016 | Wu |
| 9,417,506 B1 | 8/2016 | Tirosh |
| D766,185 S | 9/2016 | Hagarty |
| D767,199 S | 9/2016 | Wronski et al. |
| 9,447,917 B1 | 9/2016 | Wronski et al. |
| D768,325 S | 10/2016 | Xu |
| D768,326 S | 10/2016 | Guzzini |
| D769,501 S | 10/2016 | Jeswani et al. |
| D770,065 S | 10/2016 | Tittle |
| 9,476,552 B2 | 10/2016 | Myers et al. |
| 9,488,324 B2 | 11/2016 | Shum et al. |
| D776,324 S | 1/2017 | Gierl et al. |
| D777,967 S | 1/2017 | Redfern |
| 9,534,751 B2 | 1/2017 | Maglica et al. |
| D778,241 S | 2/2017 | Holbrook et al. |
| D778,484 S | 2/2017 | Guzzini |
| D779,100 S | 2/2017 | Redfern |
| 9,581,302 B2 | 2/2017 | Danesh |
| 9,599,315 B1 | 3/2017 | Harpenau et al. |
| 9,605,910 B2 | 3/2017 | Swedberg et al. |
| D785,228 S | 4/2017 | Guzzini |
| D786,472 S | 5/2017 | Redfern |
| D786,474 S | 5/2017 | Fujisawa |
| D788,330 S | 5/2017 | Johnson et al. |
| D790,102 S | 6/2017 | Guzzini |
| 9,673,597 B2 | 6/2017 | Lee |
| 9,689,541 B2 | 6/2017 | Wronski |
| D791,709 S | 7/2017 | Holton |
| D791,711 S | 7/2017 | Holton |
| D791,712 S | 7/2017 | Holton |
| 9,696,021 B2 | 7/2017 | Wronski |
| 9,702,516 B1 | 7/2017 | Vasquez et al. |
| D795,820 S | 8/2017 | Wengreen |
| 9,732,904 B1 | 8/2017 | Wronski |
| 9,739,464 B2 | 8/2017 | Wronski |
| 9,791,111 B1 | 10/2017 | Huang et al. |
| 9,803,839 B2 | 10/2017 | Visser et al. |
| D805,660 S | 12/2017 | Creasman et al. |
| D809,176 S | 1/2018 | Partington |
| 9,863,619 B2 | 1/2018 | Mak |
| D809,465 S | 2/2018 | Keirstead |
| 9,964,266 B2 | 5/2018 | Danesh |
| D820,494 S | 6/2018 | Cohen |
| 9,995,441 B2 | 6/2018 | Power et al. |
| D824,494 S | 7/2018 | Martins et al. |
| D832,218 S | 10/2018 | Wronski et al. |
| D833,977 S | 11/2018 | Danesh et al. |
| 10,139,059 B2 | 11/2018 | Danesh |
| D836,976 S | 1/2019 | Reese et al. |
| D848,375 S | 5/2019 | Danesh et al. |
| D851,046 S | 6/2019 | Peng et al. |
| 2002/0172047 A1 | 11/2002 | Ashley |
| 2003/0006353 A1 | 1/2003 | Dinh et al. |
| 2003/0016532 A1 | 1/2003 | Reed |
| 2003/0021104 A1 | 1/2003 | Tsao |
| 2003/0161153 A1 | 8/2003 | Patti |
| 2004/0001337 A1 | 1/2004 | Defouw et al. |
| 2004/0156199 A1 | 8/2004 | Rivas et al. |
| 2005/0225966 A1 | 10/2005 | Hartmann et al. |
| 2005/0227536 A1 | 10/2005 | Gamache et al. |
| 2005/0231962 A1 | 10/2005 | Koba et al. |
| 2005/0237746 A1 | 10/2005 | Yiu |
| 2006/0005988 A1 | 1/2006 | Jorgensen |
| 2006/0158873 A1 | 7/2006 | Newbold et al. |
| 2006/0198126 A1 | 9/2006 | Jones |
| 2006/0215408 A1 | 9/2006 | Lee |
| 2006/0237601 A1 | 10/2006 | Rinderer |
| 2006/0243877 A1 | 11/2006 | Rippel |
| 2006/0250788 A1 | 11/2006 | Hodge et al. |
| 2007/0035951 A1 | 2/2007 | Tseng |
| 2007/0185675 A1 | 8/2007 | Papamichael et al. |
| 2007/0200039 A1 | 8/2007 | Petak |
| 2007/0206374 A1 | 9/2007 | Petrakis et al. |
| 2008/0002414 A1 | 1/2008 | Miletich et al. |
| 2008/0112168 A1 | 5/2008 | Pickard et al. |
| 2008/0112170 A1 | 5/2008 | Trott |
| 2008/0112171 A1 | 5/2008 | Patti et al. |
| 2008/0137347 A1 | 6/2008 | Trott et al. |
| 2008/0165545 A1 | 7/2008 | O'Brien |
| 2008/0232116 A1 | 9/2008 | Kim |
| 2008/0247181 A1 | 10/2008 | Dixon |
| 2009/0003009 A1 | 1/2009 | Tessnow et al. |
| 2009/0034261 A1 | 2/2009 | Grove |
| 2009/0080189 A1 | 3/2009 | Wegner |
| 2009/0086484 A1 | 4/2009 | Johnson |
| 2009/0135613 A1 | 5/2009 | Peng |
| 2009/0141500 A1 | 6/2009 | Peng |
| 2009/0141506 A1 | 6/2009 | Lan et al. |
| 2009/0141508 A1 | 6/2009 | Peng |
| 2009/0147517 A1 | 6/2009 | Li |
| 2009/0161356 A1 | 6/2009 | Negley et al. |
| 2009/0237924 A1 | 9/2009 | Ladewig |
| 2009/0280695 A1 | 11/2009 | Sekela et al. |
| 2009/0283292 A1 | 11/2009 | Lehr |
| 2009/0290343 A1 | 11/2009 | Brown et al. |
| 2010/0014282 A1 | 1/2010 | Danesh |
| 2010/0061108 A1 | 3/2010 | Zhang et al. |
| 2010/0110690 A1 | 5/2010 | Hsu et al. |
| 2010/0110698 A1 | 5/2010 | Harwood et al. |
| 2010/0148673 A1 | 6/2010 | Stewart et al. |
| 2010/0149822 A1 | 6/2010 | Cogliano et al. |
| 2010/0165643 A1 | 7/2010 | Russo et al. |
| 2010/0244709 A1 | 9/2010 | Steiner et al. |
| 2010/0246172 A1 | 9/2010 | Liu |
| 2010/0259919 A1 | 10/2010 | Khazi et al. |
| 2010/0270903 A1 | 10/2010 | Jao et al. |
| 2010/0284185 A1* | 11/2010 | Ngai .................... E04B 9/00 362/235 |
| 2010/0302778 A1 | 12/2010 | Dabiet et al. |
| 2011/0043040 A1 | 2/2011 | Porter et al. |
| 2011/0063831 A1 | 3/2011 | Cook |
| 2011/0068687 A1 | 3/2011 | Takahasi et al. |
| 2011/0069499 A1 | 3/2011 | Trott et al. |
| 2011/0080750 A1 | 4/2011 | Jones et al. |
| 2011/0116276 A1 | 5/2011 | Okamura et al. |
| 2011/0121756 A1 | 5/2011 | Thomas et al. |
| 2011/0134634 A1 | 6/2011 | Gingrich, III et al. |
| 2011/0134651 A1 | 6/2011 | Berman |

(56) References Cited

U.S. PATENT DOCUMENTS

| | | | |
|---|---|---|---|
| 2011/0140633 A1* | 6/2011 | Archenhold | F21S 8/026 315/291 |
| 2011/0170294 A1 | 7/2011 | Mier-Langner et al. | |
| 2011/0194299 A1 | 8/2011 | Crooks et al. | |
| 2011/0216534 A1 | 9/2011 | Tickner et al. | |
| 2011/0226919 A1 | 9/2011 | Fryzek et al. | |
| 2011/0241557 A1 | 10/2011 | Grotkowski et al. | |
| 2011/0255292 A1 | 10/2011 | Shen | |
| 2011/0267828 A1 | 11/2011 | Bazydola et al. | |
| 2011/0285314 A1 | 11/2011 | Carney et al. | |
| 2012/0020104 A1 | 1/2012 | Biebl et al. | |
| 2012/0074852 A1 | 3/2012 | Delnoij | |
| 2012/0106176 A1 | 5/2012 | Lopez et al. | |
| 2012/0113642 A1 | 5/2012 | Catalano | |
| 2012/0140442 A1 | 6/2012 | Woo et al. | |
| 2012/0162994 A1 | 6/2012 | Wasniewski et al. | |
| 2012/0182744 A1 | 7/2012 | Santiago et al. | |
| 2012/0188762 A1 | 7/2012 | Joung et al. | |
| 2012/0243237 A1 | 9/2012 | Toda et al. | |
| 2012/0287625 A1 | 11/2012 | Macwan et al. | |
| 2012/0305868 A1 | 12/2012 | Callahan et al. | |
| 2013/0009552 A1 | 1/2013 | Page | |
| 2013/0010476 A1 | 1/2013 | Pickard et al. | |
| 2013/0016864 A1* | 1/2013 | Ivey | H04R 1/028 381/340 |
| 2013/0033872 A1 | 2/2013 | Randolph et al. | |
| 2013/0051012 A1 | 2/2013 | Oehle et al. | |
| 2013/0141913 A1 | 6/2013 | Sachsenweger | |
| 2013/0155681 A1 | 6/2013 | Nall et al. | |
| 2013/0163254 A1 | 6/2013 | Chang et al. | |
| 2013/0170232 A1 | 7/2013 | Park et al. | |
| 2013/0170233 A1 | 7/2013 | Nezu et al. | |
| 2013/0258677 A1 | 10/2013 | Fryzek et al. | |
| 2013/0265750 A1 | 10/2013 | Pickard et al. | |
| 2013/0271989 A1 | 10/2013 | Hussell et al. | |
| 2013/0294084 A1 | 11/2013 | Kathawate et al. | |
| 2013/0301252 A1 | 11/2013 | Hussell et al. | |
| 2013/0322062 A1 | 12/2013 | Danesh | |
| 2013/0322084 A1 | 12/2013 | Ebisawa | |
| 2013/0335980 A1 | 12/2013 | Nakasuji et al. | |
| 2014/0036497 A1 | 2/2014 | Hussell et al. | |
| 2014/0049957 A1 | 2/2014 | Goelz et al. | |
| 2014/0063776 A1 | 3/2014 | Clark et al. | |
| 2014/0071679 A1 | 3/2014 | Booth | |
| 2014/0071687 A1 | 3/2014 | Tickner et al. | |
| 2014/0140490 A1 | 5/2014 | Roberts et al. | |
| 2014/0063818 A1 | 6/2014 | Randolph et al. | |
| 2014/0159616 A1 | 6/2014 | Wang et al. | |
| 2014/0233246 A1 | 8/2014 | Lafreniere et al. | |
| 2014/0254177 A1 | 9/2014 | Danesh | |
| 2014/0265933 A1 | 9/2014 | Melanson et al. | |
| 2014/0268836 A1 | 9/2014 | Thompson | |
| 2014/0268869 A1 | 9/2014 | Blessitt et al. | |
| 2014/0299730 A1 | 10/2014 | Green et al. | |
| 2014/0313775 A1 | 10/2014 | Myers et al. | |
| 2014/0321122 A1 | 10/2014 | Domagala et al. | |
| 2014/0347848 A1 | 11/2014 | Pisavadia et al. | |
| 2015/0009676 A1 | 1/2015 | Danesh | |
| 2015/0029732 A1* | 1/2015 | Hatch | F21V 15/01 362/365 |
| 2015/0078008 A1 | 3/2015 | He | |
| 2015/0138779 A1 | 5/2015 | Livesay et al. | |
| 2015/0184837 A1 | 7/2015 | Zhang et al. | |
| 2015/0198324 A1 | 7/2015 | O'Brien et al. | |
| 2015/0219317 A1 | 8/2015 | Gatof et al. | |
| 2015/0233556 A1 | 8/2015 | Danesh | |
| 2015/0241039 A1 | 8/2015 | Fryzek | |
| 2015/0263497 A1 | 9/2015 | Korcz et al. | |
| 2015/0276185 A1 | 10/2015 | Bailey et al. | |
| 2015/0308662 A1 | 10/2015 | Vice et al. | |
| 2015/0345761 A1 | 12/2015 | Lawlor | |
| 2015/0362159 A1 | 12/2015 | Ludyjan | |
| 2016/0126860 A1 | 5/2016 | Summerland | |
| 2016/0209007 A1 | 7/2016 | Belmonte et al. | |
| 2016/0218626 A1 | 7/2016 | Carmen | |
| 2016/0308342 A1 | 10/2016 | Witherbee et al. | |
| 2016/0312987 A1 | 10/2016 | Danesh | |
| 2016/0348860 A1 | 12/2016 | Danesh | |
| 2016/0348861 A1 | 12/2016 | Bailey et al. | |
| 2016/0366738 A1 | 12/2016 | Boulanger et al. | |
| 2017/0045213 A1 | 2/2017 | Williams et al. | |
| 2017/0059135 A1 | 3/2017 | Jones | |
| 2017/0138576 A1 | 5/2017 | Peng et al. | |
| 2017/0138581 A1 | 5/2017 | Doust | |
| 2017/0198896 A1 | 7/2017 | May | |
| 2017/0307188 A1 | 10/2017 | Oudina et al. | |
| 2018/0231197 A1 | 8/2018 | Danesh | |
| 2019/0049080 A1 | 2/2019 | Danesh | |
| 2019/0063701 A1 | 2/2019 | Lotfi et al. | |
| 2019/0093836 A1 | 3/2019 | Danesh | |

FOREIGN PATENT DOCUMENTS

| | | |
|---|---|---|
| CA | 2691480 C | 4/2012 |
| CA | 2734369 A1 | 10/2013 |
| CA | 2561459 A1 | 11/2013 |
| CA | 2815067 | 11/2013 |
| CA | 2848289 A1 | 10/2014 |
| CN | 2182475 Y | 11/1994 |
| CN | 201059503 Y | 5/2008 |
| CN | 201259125 Y | 6/2009 |
| CN | 101608781 A | 12/2009 |
| CN | 201636626 U | 11/2010 |
| CN | 102062373 A | 5/2011 |
| CN | 202014067 U | 10/2011 |
| CN | 202392473 U | 8/2012 |
| CN | 202733693 U | 2/2013 |
| CN | 103307518 A | 9/2013 |
| CN | 103322476 A | 9/2013 |
| CN | 203215483 U | 9/2013 |
| CN | 101498411 B | 11/2013 |
| CN | 203273663 U | 11/2013 |
| CN | 203297980 U | 11/2013 |
| CN | 203628464 U | 12/2013 |
| CN | 203641919 U | 6/2014 |
| CN | 204300818 U | 4/2015 |
| CN | 104654142 A | 5/2015 |
| CN | 204513161 U | 7/2015 |
| CN | 204611541 U | 9/2015 |
| CN | 204786225 U | 11/2015 |
| CN | 204829578 U | 12/2015 |
| CN | 103712135 B | 4/2016 |
| CN | 205606362 U | 9/2016 |
| CN | 206130742 U | 4/2017 |
| CN | 103154606 B | 5/2017 |
| CN | 206222112 U | 6/2017 |
| CN | 107013845 A | 8/2017 |
| CN | 107084343 A | 8/2017 |
| DE | 9109828 U1 | 2/1992 |
| DE | 199 47 208 | 5/2001 |
| EP | 1 672 155 A1 | 6/2006 |
| EP | 2 095 938 A1 | 2/2008 |
| EP | 2 306 072 A1 | 4/2011 |
| EP | 2 453 169 A2 | 5/2012 |
| EP | 2 193 309 B1 | 7/2012 |
| EP | 2 735 787 A1 | 5/2014 |
| EP | 3 104 024 A1 | 12/2016 |
| GB | 2427020 A | 12/2006 |
| GB | 2509772 A | 7/2014 |
| JP | H02113002 U | 9/1990 |
| JP | 2007091052 A | 4/2007 |
| JP | 2007265961 A | 10/2007 |
| JP | 2011060450 A2 | 3/2011 |
| JP | 2012064551 A2 | 3/2012 |
| JP | 2015002027 A2 | 1/2015 |
| JP | 2015002028 A2 | 1/2015 |
| JP | 2017107699 A2 | 6/2017 |
| KR | 1020110008796 A | 1/2011 |
| KR | 1020120061625 A | 6/2012 |
| MX | 2011002947 A | 9/2011 |
| TW | 474382 U | 1/2002 |
| WO | WO 2013/128896 A1 | 9/2013 |

(56) References Cited

FOREIGN PATENT DOCUMENTS

| WO | WO 2015/000212 A1 | 1/2015 |
|---|---|---|
| WO | WO 2016152166 A2 | 9/2016 |

OTHER PUBLICATIONS

Non-Final Office Action dated Dec. 5, 2018 from U.S. Appl. No. 14/942,937, 13 pages.
Civil Action No. 2:18-cv-07090. Complaint for Infringement and Unfair Competition. *DMF, Inc.* v. *AMP Plus, Inc. d/b/a ELCO Lighting*. 52 pages. Dated Aug. 15, 2018.
Non-Final Office Action dated Feb. 7, 2019 from U.S. Appl. No. 16/200,393, 32 pages.
Non-Final Office Action dated Jul. 24, 2018 from U.S. Appl. No. 29/638,259, 5 pages.
Notice of Allowance dated Feb. 8, 2019 from U.S. Appl. No. 29/541,565, 5 pages.
Notice of Allowance dated Jan. 2, 2019 from U.S. Appl. No. 29/541,565, 6 pages.
Notice of Allowance dated Jan. 28, 2019 from U.S. Appl. No. 29/664,471, 8 pages.
RACO 4 in. Octagon Welded Concrete Ring, 3-1/2 in. Deep with 1/2 and 3/4 in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
RACO 4 in. Octagon Welded Concrete Ring, 6 in. Deep with 1/2 and 3/4 in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
U.S. Appl. No. 29/678,478, filed Jan. 29, 2019, Danesh et al.
U.S. Appl. No. 29/678,482, filed Jan. 29, 2019, Danesh et al.
"Advanced LED Solutions," Imtra Marine Lighting. 2011. 39 pages.
"Cree LMH2 LED Module with TrueWhite Technology," Cree Product Family Data Sheet. 2011. 3 pages.
"Cree LMH2 LED Modules Design Guide," Cree Product Design Guide. 2011. 20 pages.
"Cree LMH2 LED Modules," Mouser Electronics. 2 pages.
"LED Undercabinet Pocket Guide," ELCO Lighting.12 pages.
"Membrane Penetrations in Fire-Resistance Rated Walls," https://www.ul.com/wp-content/uploads/2014/04/ul_MembranePenetrations.pdf, Issue 1, 2009, 2 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
"Metallic Outlet Boxes," UL 514A, Underwriters Laboratories, Inc., Feb. 16, 2004 (Title Page Reprinted Aug. 10, 2007), 106 pages.
"Outlet Boxes for Use in Fire Rated Assemblies," https://www.ul.com/wp-content/uploads/2014/04/Ul_outletboxes.pdf, 2011, 2 pages.
"Portland Bi-Color, Warm White/Red," item:ILIM30941.Imtra Marine Products. 2012. 3 pages.
"Undercabinet Pucks, Xyris Mini LED Puck Light," ELCO Lighting. Sep. 2018. 1 page.
"VERSI LED Mini Flush," Lithonia Lghting. 6 pages.
<https://www.zhagastandard.org/books/book18/>, Mar. 2017, 5 pages.
2006 International Building Code, Section 712 Penetrations, 2006, 4 pages.
Acrich COB Zhaga Module, Product Description, Seoul Semiconductor, Nov. 2016, 39 pages.
Bortz, J. C. et al., "Optimal design of a nonimaging TIR doublet lens for an illumination system using an LED source", Proc. SPIE 5529, Nonimaging Optics and Efficient Illumination Systems, (Sep. 29, 2004); doi: 10.1117/12.562598; https://doi.org/10.1117/12.562598, 10 pages.
BXUV.GuideInfo, Fire Resistance Ratings—ANSI/UL 263, UL Online Certifications Directory, last updated Nov. 3, 2016, 27 pages.

Canadian Office Action dated Aug. 11, 2017 from Canadian Application No. 2,941,051, 4 pages.
Canadian Office Action dated Dec. 23, 2013 from Canadian Application No. 2,778,581, 3 pages.
Canadian Office Action dated Dec. 6, 2016 from Canadian Application No. 2,879,629, 3 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Mar. 22, 2016 from Canadian Application No. 2,879,629, 4 pages.
Canadian Office Action dated Mar. 9, 2017 from Canadian Application No. 2,931,588, 5 pages.
Carlon® Zip Box® Blue™ Switch and Outlet Boxes, Product Brochure, http://www.carlonsales.com/brochures.php, 2006, 22 pages.
CEYY.GuideInfo, Outlet Boxes and Fittings Certified for Fire Resistance, UL Online Certifications Directory, last updated May 16, 2013, 2 pages.
Cree LED Lamp Family Sales Sheet—Better light is beautiful light , Apr. 24, 2017, 2 pages.
DME Series Installation Instructions, Oct. 18, 2011, 2 pages.
DMF, Inc., "dmfLighting: LED Recessed Downlighting," DRD2 Product Brochure, Oct. 23, 2014, 50 pages.
DMF, Inc., "dmfLighting: LED Recessed Downlighting," Product Catalog, Aug. 2012, 68 pages.
DMF, Inc., "dmfLighting: LED Recessed Lighting Solutions," Info sheets, Mar. 15, 2012, 4 pages.
Dross, O. et al., "Review of SMS design methods and real-world applications", Proc. SPIE 5529, Nonimaging Optics and Efficient Illumination Systems, (Sep. 29, 2004); doi: 10.1117/12.561336; https://doi.org/10.1117/12.561336, 14 pages.
Final Office Action dated Apr. 2, 2015 from U.S. Appl. No. 13/484,901, 13 pages.
Final Office Action dated Apr. 27, 2016 from U.S. Appl. No. 14/184,601, 19 pages.
Final Office Action dated Jan. 29, 2016 from U.S. Appl. No. 14/183,424, 21 pages.
Final Office Action dated Jul. 26, 2017 from U.S. Appl. No. 14/184,601, 18 pages.
Final Office Action dated Jun. 23, 2016 from U.S. Appl. No. 13/484,901, 18 pages.
HALO, H7 LED Downlight Trims 49x Series, 6-inch LED Trims for Use with MI7x LED Modules, Cooper Lighting, ADV110422, rev. Aug. 12, 2011, 15 pages.
HALO, HALO LED H4 H7 Collection, SustainabLEDesign, Cooper Lighting, (emphasis on p. 18 "H7 Collection LED Modules—Halo LED H7 Module Features,") Mar. 28, 2012, 52 pages.
HALO, LED Module ML706x, Cooper Lighting, General Installation for All Modules/p. 1; Tether Installation/pp. 2-3; Installation into HALO H750x Series LED—only (Non-Screw Based), Recessed Fixture, p. 4, Oct. 20, 2009, 4 pages.
International Search Report and Written Opinion in PCT/US2018/048357 dated Nov. 14, 2018, 13 pages.
Medvedev, V. et al., "Uniform LED illuminator for miniature displays," Proc. SPIE 3428, Illumination and Source Engineering, (Oct. 20, 1998); doi: 10.1117/12.327957;https://doi.org/10.1117/12.327957, 13 pages.
Non-Final Office Action dated Apr. 12, 2018 for U.S. Appl. No. 29/638,259, 5 pages.
Non-Final Office Action dated Apr. 30, 2010 from U.S. Appl. No. 12/173,232, 13 pages.
Non-Final Office Action dated Dec. 15, 2016 from U.S. Appl. No. 14/184,601, 18 pages.
Non-Final Office Action dated Feb. 6, 2018 from U.S. Appl. No. 15/167,682, 9 pages.
Non-Final Office Action dated Jul. 20, 2015 from U.S. Appl. No. 14/184,601, 16 pages.
Non-Final Office Action dated Jun. 2, 2015 from U.S. Appl. No. 14/183,424, 20 pages.
Non-Final Office Action dated Jun. 25, 2018 for U.S. Appl. No. 29/541,565, 10 pages.

(56) References Cited

OTHER PUBLICATIONS

Non-Final Office Action dated Mar. 15, 2010 from U.S. Appl. No. 12/100,148, 8 pages.
Non-Final Office Action dated May 16, 2018 for U.S. Appl. No. 15/132,875, 18 pages.
Non-Final Office Action dated May 17, 2017 from U.S. Appl. No. 14/183,424, 20 pages.
Non-Final Office Action dated Oct. 16, 2014 from U.S. Appl. No. 13/484,901, 11 pages.
Non-Final Office Action dated Oct. 24, 2018 for U.S. Appl. No. 15/688,266, 14 pages.
Non-Final Office Action dated Sep. 15, 2015 from U.S. Appl. No. 13/484,901, 16 pages.
Non-Final Office Action dated Sep. 5, 2014 from U.S. Appl. No. 13/791,087, 8 pages.
Non-Final Office Action dated Sep. 6, 2017 from U.S. Appl. No. 14/726,064, 8 pages.
Notice of Allowance dated Aug. 23, 2017 from Canadian Application No. 2,879,629, 1 page.
Notice of Allowance dated Jan. 16, 2015 from U.S. Appl. No. 29/467,026, 9 pages.
Notice of Allowance dated Jan. 30, 2015 from U.S. Appl. No. 13/791,087, 9 pages.
Notice of Allowance dated Mar. 24, 2016 from U.S. Appl. No. 14/247,149, 8 pages.
Notice of Allowance dated Mar. 26, 2018 for U.S. Appl. No. 14/184,601, 10 pages.
Notice of Allowance dated May 10, 2018 from U.S. Appl. No. 14/726,064, 7 pages.
Notice of Allowance dated May 22, 2018 from U.S. Appl. No. 14/183,424, 9 pages.
Notice of Allowance dated Nov. 27, 2018 from U.S. Appl. No. 15/167,682, 11 pages.
Notice of Allowance dated Oct. 21, 2016 from U.S. Appl. No. 13/484,901, 7 pages.
Notice of Allowance dated Oct. 4, 2018 from U.S. Appl. No. 15/947,065 , 9 pages.
Notice of Allowance dated Oct. 9, 2018 from U.S. Appl. No. 29/653,142, 7 pages.
Notice of Allowance dated Sep. 19, 2018 from U.S. Appl. No. 15/167,682 , 7 pages.
Notice of Allowance dated Sep. 21, 2018 from U.S. Appl. No. 29/645,941, 5 pages.
OneFrame Recessed LED Downlight. Dmflighting.com. Published Jun. 6, 2018. Retrieved at https://www.dmflighting.com/product/oneframe on Jun. 6, 2018. 11 pages.
4" Octagon Concrete Boxes and Back Plates. Appleton. Accessed at www.appletonelec.com on May 6, 2019. 1 page.
Cooper Lighting HALO ML56 LED System Product Sheet. Mar. 2, 2015. Accessed at http://www.cooperindustries.com/content/dam/public/lighting/products/documents/halo/spec_sheets/halo-m156600-80cri-141689-sss.pdf. 8 pages.
CS&E PCT Collaborative Search and Examination Pilot Upload Peer Contribution in International Patent Application No. PCT/US18/62868 dated Mar. 14, 2019, 61 pages.
CS&E PCT Collaborative Search and Examination Pilot Upload Peer Contribution in International Patent Application No. PCT/US18/67614 dated Apr. 24, 2019, 53 pages.
Ex-Parte Quayle Action dated Jun. 27, 2019 from U.S. Appl. No. 29/683,730, 5 pages.
Final Office Action dated Jun. 6, 2019 from U.S. Appl. No. 15/688,266, 7 pages.
Final Office Action dated Mar. 15, 2019 from U.S. Appl. No. 15/132,875, 15 pages.
IC1 JB Housing 4" 1C-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019.
Imtra Marine Lighting 2008 Catalog. 40 pages.
Imtra Marine Lighting 2009 Catalog. 32 pages.
Imtra Marine Lighting Spring 2007 Catalog. 36 pages.
International Search Report and Written Opinion in International Patent Application No. PCT/US18/62868 dated Mar. 14, 2019, 13 pages.
International Search Report and Written Opinion in International Patent Application No. PCT/US18/67614 dated Apr. 25, 2019, 20 pages.
International Search Report and Written Opinion in International Patent Application No. PCT/US19/14847 dated Jun. 6, 2019, 24 pages.
International Search Report and Written Opinion in International Patent Application No. PCT/US19/32281 dated Aug. 2, 2019, 18 pages.
KwikBrace® New Construction Braces for Lighting Fixtures or Ceiling Fans 1-1/2 in. Depth. Hubbel. Accessed at https://hubbellcdn.com/specsheet/926.pdf on Jun. 27, 2019. 1 page.
Non-Final Office Action dated Apr. 4, 2019 from U.S. Appl. No. 29/678,482, 8 pages.
Non-Final Office Action dated Jun. 11, 2019 from U.S. Appl. No. 15/901,738, 6 pages.
Notice of Allowance dated Apr. 1, 2019 from U.S. Appl. No. 15/167,682, 7 pages.
Notice of Allowance dated Apr. 17, 2019 from U.S. Appl. No. 29/678,478, 7 pages.
Notice of Allowance dated Apr. 8, 2019 from U.S. Appl. No. 29/653,142, 8 pages.
Notice of Allowance dated Jul. 31, 2019 from U.S. Appl. No. 15/167,682 , 7 pages.
RACO Commercial, Industrial and Residential Electrical Products. Hubbell. Accessed at www.Hubbell-RTB.com on May 6, 2019. 356 pages.
Specification & Features 4" Octagonal Concrete Box Covers. Orbit Industries, Inc. Accessed at https://www.orbitelectric.com on May 6, 2019. 1 page.
Supplemenatal Notice of Allowance dated Aug. 5, 2019 from U.S. Appl. No. 15/947,065, 2 pages.
Notice of Allowance dated Sep. 11, 2019 from U.S. Appl. No. 29/653,142, 6 pages.

* cited by examiner

THIN PROFILE SURFACE MOUNT LIGHTING APPARATUS

CROSS-REFERENCES TO RELATED APPLICATIONS

The present application claims the benefit, under 35 U.S.C. § 119(e), of U.S. provisional application Ser. No. 62/523,640, filed Jun. 22, 2017, entitled "Surface Mounted Ceiling Lamp," and U.S. provisional application Ser. No. 62/552,126, filed Aug. 30, 2017, entitled "Surface Mounted Ceiling Lamp." The present application also claims the benefit, under 35 U.S.C. § 120, as a continuation-in-part (CIP) of U.S. design application Ser. No. 29/648,046, filed May 17, 2018, entitled "Light Fixture." Each of the aforementioned applications is incorporated by reference herein in its entirety.

BACKGROUND

Some conventional surface mount LED downlights may be coupled to a junction box disposed behind a ceiling and may be employed in new construction or retrofit architectural projects. One such example is the "Disk Light" provided by Commercial Electric and manufactured by Cree (manufacturer model number CE-JB6-650L-27K-E26). The Disk Light can be installed in an existing recessed can or a four-inch junction box and includes a semi recessed lens. The Commercial Electric Disk Light may be used indoors and in an outdoor enclosed setting, and is generally intended for kitchens, hallways, bathrooms, closets, laundry, porches and garage work rooms. Another example is the Halo Surface Mount LED Downlight (SMD) series, which are low-profile surface mount luminaires designed for installation in many 3½" and 4" square, octagon, or round junction boxes.

SUMMARY

Various inventive concepts disclosed herein relate generally to a thin surface mount type of luminaire, wherein "thin" refers to the protruding portion of the luminaire below the line of the ceiling, for example. In various implementations, the luminaire can be installed from below the ceiling by a twist lock mechanism or by clips into a junction box that is installed in the ceiling. Some implementations include a test switch that is accessible from the portion of the luminaire that protrudes below the ceiling line. The lens of some implementations combines a total internal reflection lens with a conical structure buried at its center. In other implementations, the luminaire includes a plurality of light sources distributed evenly across a light producing portion of the luminaire. In such implementations, the light sources can comprise LEDs.

In sum, one inventive implementation is directed to an LED lighting apparatus, comprising: a housing comprising at least one sidewall having a front facing edge and a back facing edge positioned adjacent to a ceiling when the LED lighting apparatus is installed in an opening of the ceiling, wherein a depth of the at least one sidewall of the housing, between the front facing edge and the back facing edge, is less than one inch such that the apparatus does not visibly appear to protrude substantially from a surface of the ceiling when the apparatus is installed in the opening of the ceiling; an LED board coupled to the housing, the LED board comprising a plurality of LEDs; and a lens coupled to the housing, the lens having a back side facing the LED board and a front side opposite to the back side, wherein the front side of the lens provides a downward facing surface when the LED lighting apparatus is installed in the opening of the ceiling, the lens being disposed with respect to the LED board such that the plurality of the LEDs illuminate the back side of the lens. A first spacing of the plurality of the LEDs on the LED board causes resulting light from the downward facing surface of the lens to be substantially uniform during operation of the apparatus. The front side of the lens, providing the downward facing surface when the LED lighting apparatus is installed in the opening in the ceiling, is essentially flush with the front facing edge of the at least one sidewall of the housing.

Another inventive implementation is directed to an LED lighting apparatus, comprising: a housing; an LED board coupled to the housing, the LED board comprising a plurality of LEDs; and a lens coupled to the housing, the lens having a back side facing the LED board and a front side opposite to the back side, wherein the front side of the lens provides a downward facing surface when the LED lighting apparatus is installed in an opening of a ceiling, the lens being disposed with respect to the LED board such that the plurality of the LEDs illuminate the back side of the lens. A first spacing of the plurality of the LEDs on the LED board causes resulting light from the downward facing surface of the lens to be substantially uniform during operation of the apparatus.

Another inventive implementation is directed to a thin profile surface mount LED lighting apparatus, comprising: a housing comprising at least one sidewall having a front facing edge and a back facing edge positioned adjacent to a ceiling when the LED lighting apparatus is installed in an opening of the ceiling, wherein a depth of the at least one sidewall of the housing, between the front facing edge and the back facing edge, is less than one inch; an LED board coupled to the housing, the LED board comprising a plurality of LEDs; and a lens coupled to the housing, the lens having a back side facing the LED board, a front side opposite to the back side and an outer edge, wherein the front side of the lens provides a downward facing surface when the LED lighting apparatus is installed in the opening of the ceiling, the lens being disposed with respect to the LED board such that the plurality of the LEDs illuminate the back side of the lens. The front facing edge of the at least one sidewall forms a perimeter around the outer edge of the lens. The front side of the lens, providing the downward facing surface when the LED lighting apparatus is installed in the opening in the ceiling, is essentially flush with the front facing edge of the at least one sidewall of the housing forming the perimeter around the outer edge of the lens. The perimeter around the outer edge of the lens is significantly thin so as not to extend significantly beyond the outer edge of the lens.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and implementations of, inventive thin profile surface mount lighting apparatus. It should be appreciated that various concepts introduced above and discussed in greater detail below may be implemented in numerous ways. Examples of specific implementations and applications are provided primarily for illustrative purposes so as to enable those skilled in the art to practice the implementations and alternatives apparent to those skilled in the art.

The figures and examples below are not meant to limit the scope of the present implementations to a single embodiment, but other implementations are possible by way of interchange of some or all of the described or illustrated elements. Moreover, where certain elements of the present implementations can be partially or fully implemented using known components, only those portions of such known components that are necessary for an understanding of the present implementations are described, and detailed descriptions of other portions of such known components are omitted so as not to obscure the present implementations. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such.

According to certain aspects, the present applicants have recognized that it would be desirable to have a low cost but aesthetically pleasing and efficient LED downlight that is, or appears to be, surface mounted to a ceiling, and which includes a thin profile and uniform lighting distribution.

Figure 1:
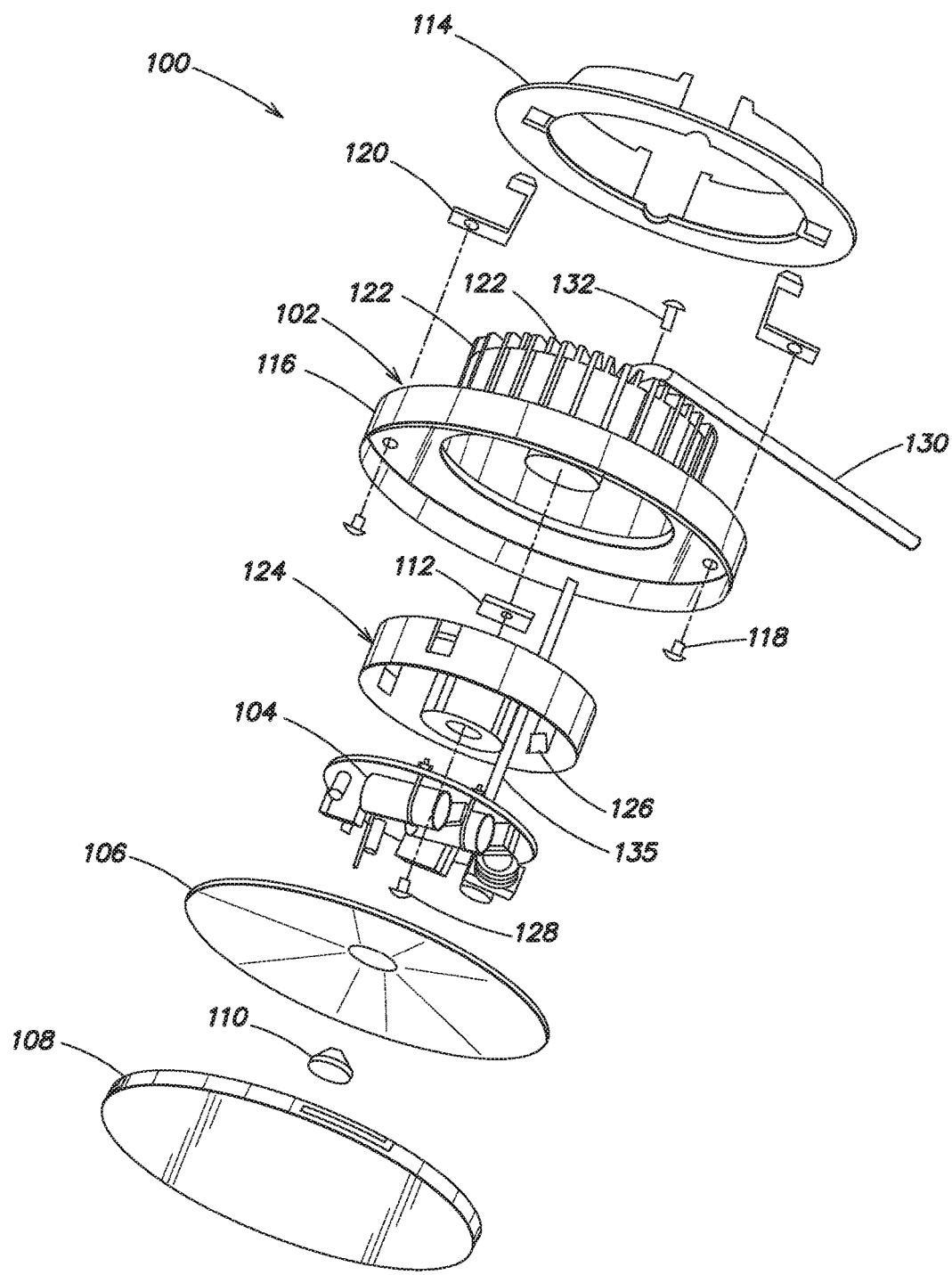
FIG. 1 is an assembly drawing of an example luminaire according to some inventive implementations.

In fulfillment of these and other aspects, FIG. 1 is an assembly drawing of an example luminaire according to some implementations.

As shown, luminaire 100 is comprised of a housing 102 having an integrally formed flange portion 116 and fins 122. As further shown, luminaire 100 also includes driver 104, reflector 106, lens 108, cone 110, light source 112 and adapter bracket 114. As will be described in more detail below, the luminaire 100 is designed to be positioned behind a ceiling or a wall such that the flange portion 116 of housing 102 extends outside a hole in the ceiling or wall (not shown) and rests flush against the exposed surface of the ceiling or wall. As such, the flange portion 116, when assembled together with lens 108, helps the luminaire 100 appear to be "surface-mounted" on the ceiling or wall, although it is not actually mounted on the surface.

The driver 104, as will be described below in more detail below, is mounted within driver module cover 124 and contained inside the housing 102 behind reflector 106, lens 108 and cone 110. The lens 108 is attached to the flange portion 116 by a twist and lock mechanism built into the outer periphery of lens 108 and inner surface of flange portion 116 as will be described in more detail below. The lens 108 thus completely fills the opening defined by flange portion 116, and thus further helps the luminaire 100 appear to be mounted on the surface of the ceiling or wall. Despite these appearances however, the luminaire is not designed to be directly mounted to the surface of the ceiling or wall.

Rather, the adapter bracket 114 allows the luminaire 100 to be installed within a junction box (not shown, for example via a twist and lock mechanism or a friction fit mechanism), the junction box being already installed within the ceiling or wall as described in more detail below. The housing 102 can be secured to bracket 114 by screws 118 and clips 120.

Housing 102, including integrally formed flange portion 116 and fins 122, may be composed of any thermally conductive material so as to help cool the luminaire during operation of light source 112. For example, housing 102 including integrally formed flange portion 116 and fins 122 may be comprised of injection molded thermally conductive plastic. In other implementations, housing 102, flange portion 116 and/or fins 122 may be made of aluminum alloys, copper, copper-tungsten pseudoalloy, AlSiC (silicon carbide in aluminum matrix), Dymalloy (diamond in copper-silver alloy matrix), E-Material (beryllium oxide in beryllium matrix), and/or other thermally conductive plastics or ceramics.

Driver 104 is an electronic circuit or device that supplies and/or regulates electrical energy to the light source 112 and thus powers the light source 112 to emit light. The driver 104 may be any type of power supply circuit, including one that includes power converters, rectifiers, power transistors and the like for delivering an appropriate alternating current (AC) or a direct current (DC) voltage to the light source 112. Upon receiving electricity, the driver 104 may regulate current or voltage to supply a stable voltage or current within the operating parameters of the light source 112. In implementations, the driver 104 receives an input current from an electrical power wiring network of the building or structure in which the luminaire 100 is installed and may drop the voltage of the input current to an acceptable level for the light source 112 (e.g., from 120V-277V to 36V-48V). In these and other implementations, ground wire 130, attached to housing 102 by screw 132, is electrically connected to the electrical power ground and wires 135 are electrically connected to a wiring network (e.g., the main house voltage of a building or other transformed voltage) and delivers power to the driver 104.

The light source 112 may be any electro-optical device or combination of devices for emitting light. For example, the light source 112 may have one or more light emitting diodes (LEDs, such as an XLamp LED from Cree), organic light-emitting diode (OLEDs), or polymer light-emitting diode (PLEDs). The light source 112 receives electricity from the driver 104, as described above, such that the light source 112 can emit a controlled beam of light toward cone 110 and lens 108, and thus into a room or surrounding area of the luminaire 100 (when installed behind a ceiling or wall) as will be described in more detail below.

Driver module cover 124 in implementations may be made of heat resistant or insulating plastic, for example plastic comprising materials selected from a group consisting of semi-crystalline polyamides, polyamide alloys, polycarbonate, polymers, minerals, glass, carbon, steel fibers, etc. In these and other implementations, insulator 124 may be formed by injection molding, extrusion or other means and dimensioned in accordance with driver 104, which is held into place inside insulator 124 via clips 126. In the illustrated embodiment, driver module cover 124 is attached to housing 102 by screws 128, which in turn aligns light source 112 with an opening in reflector 106 and thus an optical path between light source 112, lens 108 and cone 110 as will become more apparent from the descriptions below.

Figure 2A:
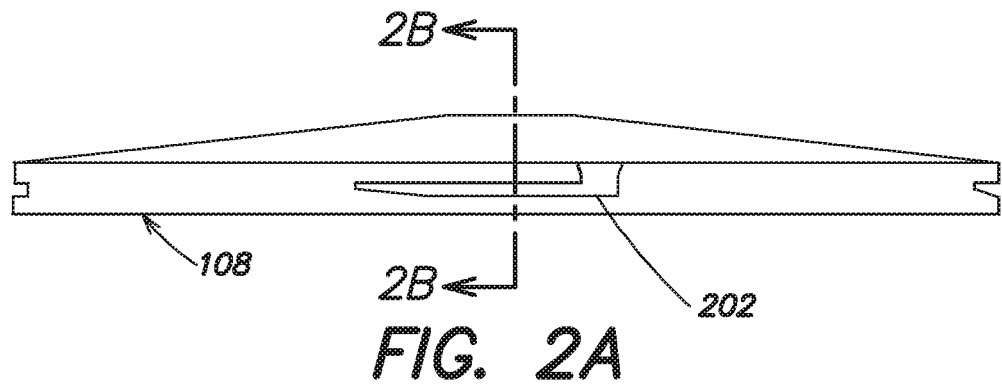
FIGS. 2A, 2B, and 2C illustrate various aspects of a lens in the assembly of FIG. 1, according to some inventive implementations.
Figure 2B:
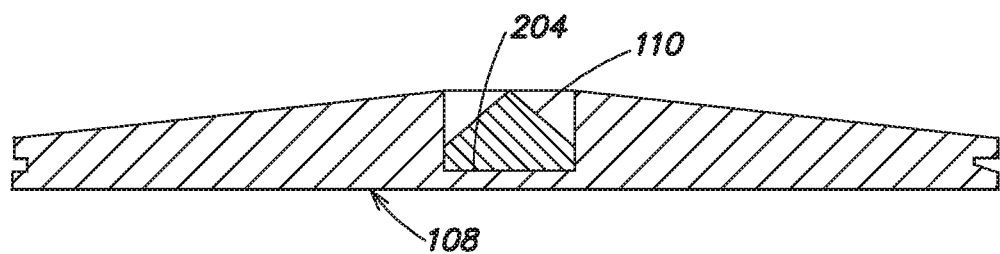
Figure 2C:
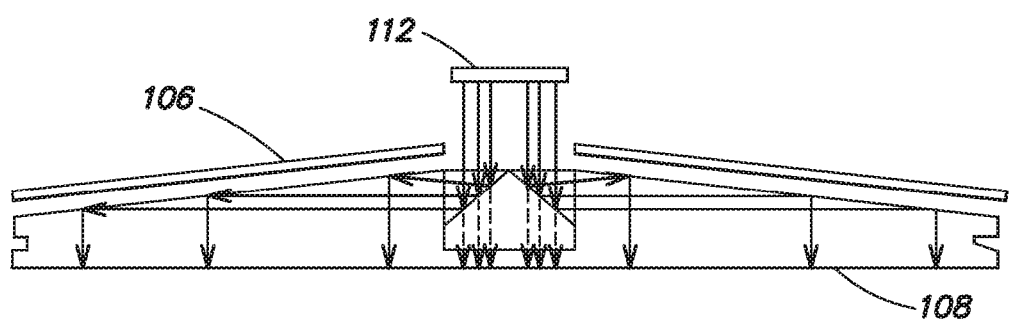

Example aspects of lens 108 and cone 110 according to implementations are shown in FIGS. 2A and 2B which provide side and cross-sectional views, respectively. FIG. 2C also provides a cross-sectional view of aspects of an operation of lens 108 and cone 110 together with light source 112 and reflector 106 when assembled and aligned together as designed. As shown in FIGS. 2A and 2B, the lens according to the present implementations is unusual. When assembled for operation according to implementations, it combines a total internal reflection lens 108 with a reflective conical structure 110 buried at its center. In implementations, cone 110 is sized and dimensioned to be held into place in a corresponding center depression 204 of lens 108 with a friction fit. In other implementations, cone 110 is held into place by an adhesive or other suitable means. In still other implementations, lens 108 and cone 110 are integrally formed together from a single unitary material, with the upper surface of cone 110 being machined or otherwise formed in the center of lens 108.

As further shown in FIG. 2C, according to operational aspects of an assembled luminaire 100, the light from light source 112 is projected toward the center of the lens and is mostly reflected by the cone 110 into the lens 108. From there it undergoes further total internal reflections within the lens forcing the light to travel downwards and out the exit side of the lens 108. Under normal conditions, the spot on the lens covered by the cone 110 would be dark because all the light would be reflected. According to the present implementations, however, the reflective surface of the cone 110 is not completely reflective. Rather, it is configured to allow about 10% of the light to pass through as will be described in more detail below. This prevents a dark spot from appearing at the exit side of lens 108 in the center portion occupied by the cone 110. It should be further noted that the total internal reflection features of lens 108 and the partially transmissive features of cone 110 allows for a uniform amount of light to be distributed across the entire surface of the exit side of lens 108, which starkly contrasts with conventional approaches, such as those having light sources arranged at a periphery of a lens. Still further, the arrangement of lens 108 and cone 110 allow for the use of only a single light source 112, which enables a low-cost design as opposed to other approaches requiring multiple light sources.

According to further aspects of some implementations, when assembled for operation together with reflector 106, any light from light source 112 that is reflected by cone 110 but which escapes from lens 108 back toward light source 112 is further reflected downward and back out the exit side of lens 108, thus increasing the operational lighting efficiency of light source 112.

Lens 108 may be made of any optically transmissive material, including glass and hard plastics. For example, lens 108 may be comprised of polycarbonate material. In one embodiment, the lens 108 also provides a protective barrier for the light source 112 and shields the light source 112 from moisture or inclement weather. As further shown in FIG. 2A, an embodiment of lens 108 includes twist and lock groove 202 formed on the outer periphery of lens 108. As such, lens 108 may be sized and shaped to be locked into position into flange portion 116 of housing 102, thereby covering the main opening at the bottom of the housing 102 and providing the shielding advantages as mentioned above. Moreover, the twist and lock mechanism allows for lens 108 to be removed from below a ceiling even when the luminaire 100 is installed, thereby allowing for components of luminaire 100 to be accessed for test, inspection, removal, replacement, etc., without having to remove the luminaire 100 from behind the ceiling or wall.

Reflector 106 may be made of any reflective material, or any material having a reflective coating. In implementations, reflector 106 is comprised of highly reflective (e.g. 98%) Valar 2.0 BRDF. In these and other implementations, reflector 106 is separately formed from lens 108 and held into place within housing 102 when lens 108 is twist and locked into flange portion 116.

Figure 3A:
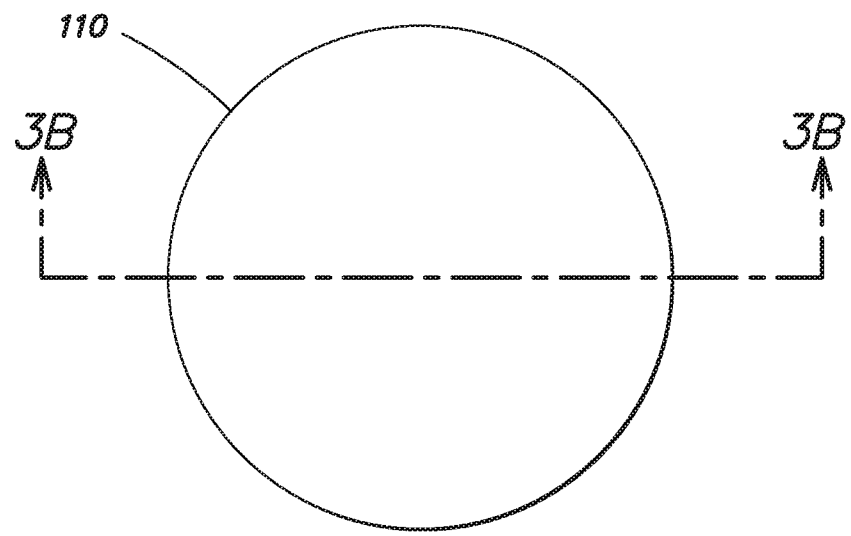
FIGS. 3A and 3B illustrate various aspects of a conical structure of the lens of FIGS. 2A through 2C, according to some inventive implementations.
Figure 3B:
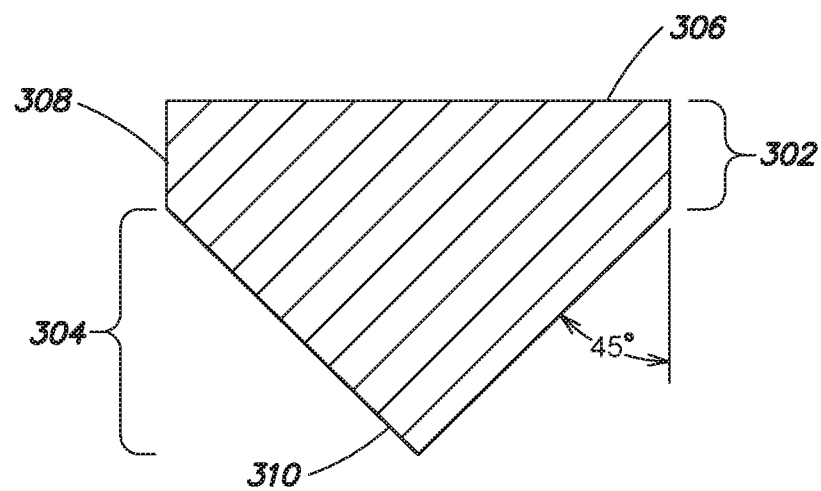

FIGS. 3A and 3B illustrate example aspects of cone 110 according to implementations in more detail, providing top and cross-sectional views of cone 110, respectively.

In the illustrated implementations, cone 110 is made of a thermoplastic material such as polycarbonate, having a base portion 302 and cone portion 304. As shown, cone portion 304 is formed so as to extend at an angle of about 45 degrees from base portion 302. Cone 110 includes bottom surface 306, side surface 308 and cone surface 310. With reference to FIG. 2, when assembled together with lens 108, the bottom surface 306 abuts with a bottom portion of depression 204 in lens 108, while side surface abuts with a side portion of depression 204 in lens 108. In implementations, cone surface 310 is treated to cause light from light source 112 to reflect towards and into lens 108, while allowing some light to enter cone 110 and exit through bottom surface 306. Accordingly, bottom surface 306 is preferably treated in these and other implementations to allow for light to be transmitted through surface 306 and toward an exit side of lens 108. In non-limiting example implementations, cone surface 310 is vacuum metalized (e.g. aluminum) to be 90% reflective and 10% transmissive, and possibly further coated with a coating such as SiO, SiO2 or organic coatings having silicates. In these and other implementations, surface 306 and surface 308 are both surface treated with a texturing specification such as LDK-1002, however such texturing is not necessary in all implementations.

Figure 4A:
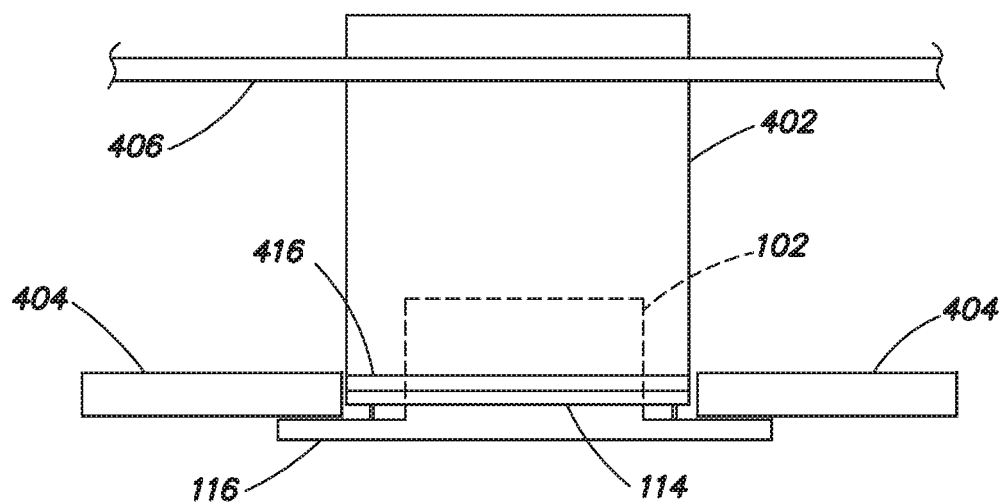
FIGS. 4A and 4B illustrate aspects of mounting a luminaire in a junction box, according to some inventive implementations.

FIG. 4A illustrates aspects of how the present implementations provide aesthetically pleasing surface mounted appearances when luminaire 100 is used as a downlight in a ceiling.

Housing 102 is secured to junction box 402 via adapter 114 and a corresponding adapter ring 416, as will be described in more detail below. Junction box 402 is mounted above an opening of ceiling 404 and can be secured to a ceiling by two or more hanger arms 406. When housing 102 is thus secured to junction box 402, flange portion 116 is flush against the surface of ceiling 404, and flange portion 116 (as well as lens 108) is the only portion of the luminaire 100 that extends outward from the surface of ceiling 404. According to aspects, flange portion 116 is thin, for example less than an inch, such that luminaire 100 does not visibly appear to protrude substantially from the surface of ceiling 404. such that luminaire 100 does not visibly appear to protrude substantially from the surface of ceiling 404.

In implementations, junction box 402 may be made of galvanized steel, injection molded plastic, aluminum or ceramic. Junction box 402 may be fire-resistant in that it has a fire rating of up to two hours without any need for modification, where the fire rating is described in the National Electrical Code (NEC) and by the Underwriters Laboratories (UL) such as specified in UL 263 Standard for Fire Tests of Building Construction and Materials. In other implementations, luminaire 100 may be attached to a standard 4×4 electrical junction box, which may or may not be fire rated.

Figure 4B:
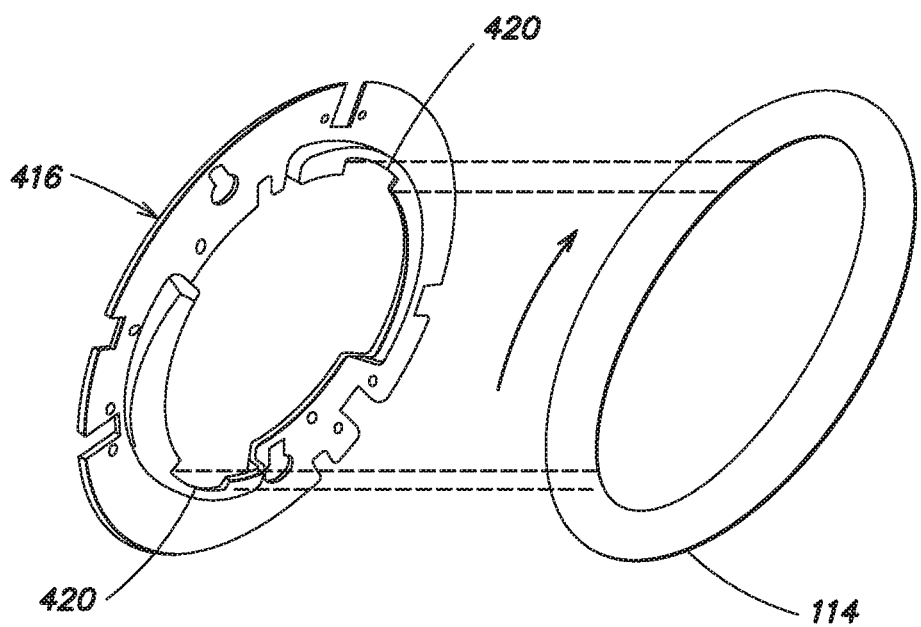

FIG. 4B shows how adapter bracket 114 and adapter ring 416 are coupled together in a twist and lock fashion, thus allowing luminaire 100 to be easily mounted to junction box 402. As shown, slot portions 420 of structures on adapter ring 416 are dimensioned to receive corresponding structures on adapter bracket 114, which structures are then fixedly coupled to adapter ring 416 when the adapter 114 and adapter ring 416 are twisted clockwise with respect to each other. Example twist and lock mechanisms that are suitable for practice with the present implementations include those described in U.S. Patent Publ. No. 2016/0348860. By virtue of such mechanisms, luminaire 100 may be easily mounted, accessed, serviced, tested and possibly replaced from below ceiling 404.

Figure 5:
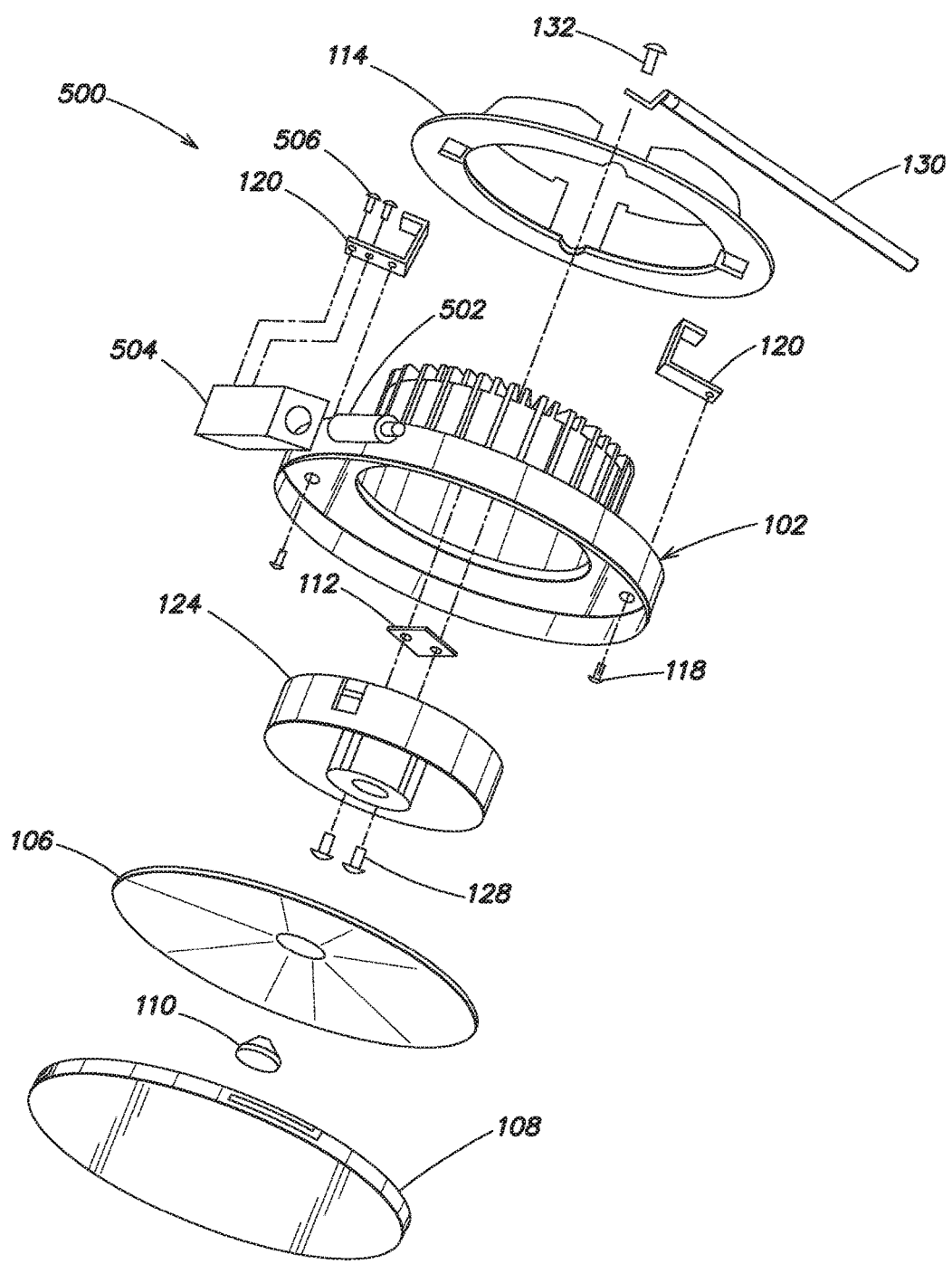
FIG. 5 is an assembly drawing of another example luminaire according to some inventive implementations.

FIG. 5 is an assembly drawing of another example luminaire 500 according to implementations.

As shown in this example, luminaire 500 includes many of the same components as luminaire 100, and so repeated descriptions thereof are not included here. Meanwhile, luminaire 500 further includes test button 502 and button housing 504. The button housing 504 in this example is mounted to the external surface of flange portion 116 of housing 102 via clip 120 and screws 506. Test button 502 can be attached to an electrical wire (not shown) and electrical signal source and can include any electrical and mechanical components so that, when test button 502 is depressed, an electrical signal is provided on the attached electrical wire. Many possible examples of such components are known to those skilled in the art, so further details thereof will be omitted here for sake of clarity of the invention.

Figure 6:
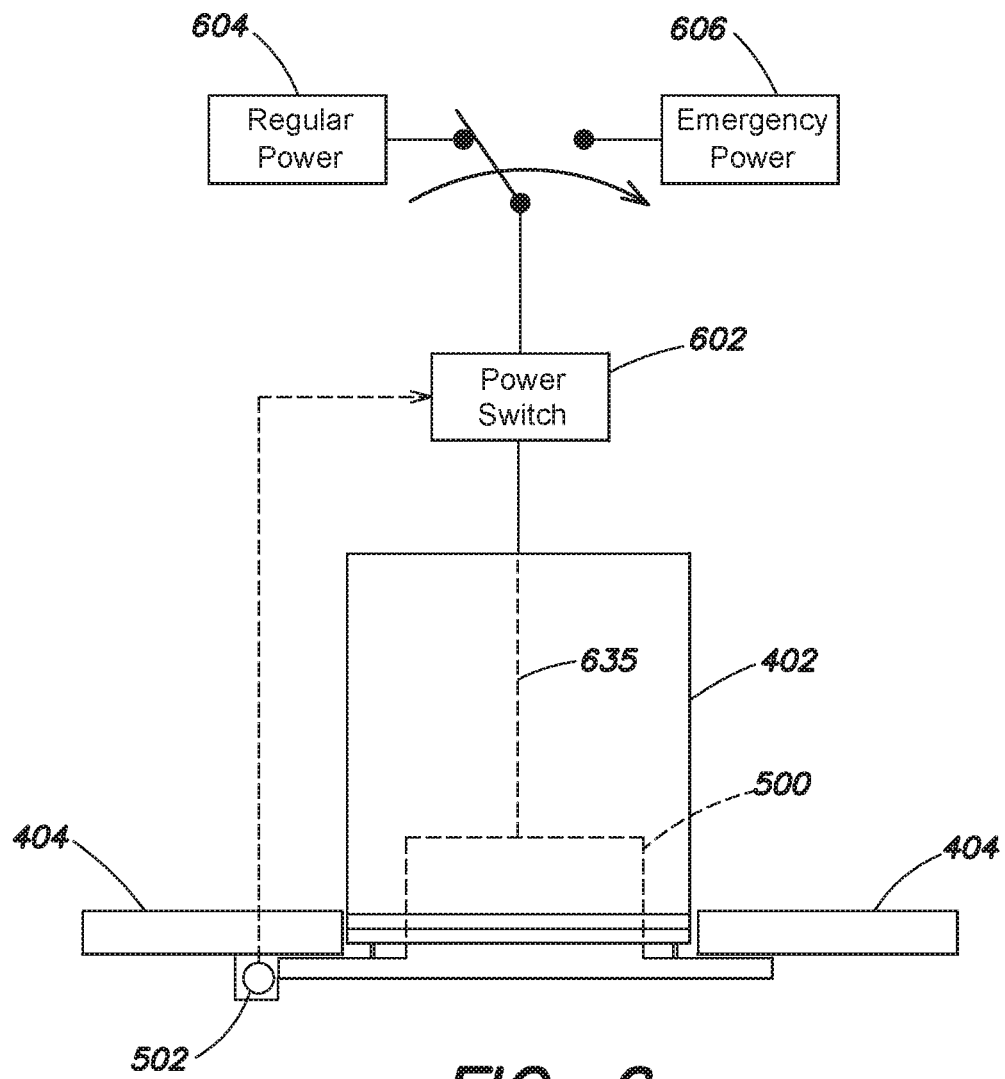
FIG. 6 illustrates various emergency aspects of the example luminaire of FIG. 5 according to some inventive implementations.

FIG. 6 illustrates example emergency aspects of luminaire 500. In this example, luminaire 500 is attached to a junction box 402 behind a ceiling 404 as described above in connection with FIGS. 4A and 4B. As such, when luminaire 500 is so attached, button 502, by virtue of being attached to flange portion 116 of housing 102, is accessible from below ceiling 404. As further illustrated, when button 502 is pressed, an electrical signal is sent to power switch 602, which causes power to the luminaire 500 (e.g. via one or more wires 630) to be switched from regular power source 604 to an emergency power source 606. For example, regular power source 604 can be an electrical power wiring network of the building or structure in which the luminaire 500 is installed. In these and other implementations, emergency power source 606 can be a backup power supply including one or more batteries and power conditioning electronics. If the emergency power source 606 is sufficient, light from luminaire 500 will be produced, thereby allowing personnel to verify emergency power source 606 without having to remove luminaire 500 or otherwise gain direct access to emergency power source 600.

It should be noted that the arrangement of elements 602, 604 and 606 with respect to junction box 402 and luminaire 500 shown in FIG. 6 is for illustration purposes only and non-limiting to the present implementations. Many other arrangements are possible, as will be appreciated by those skilled in the art.

Figure 7:
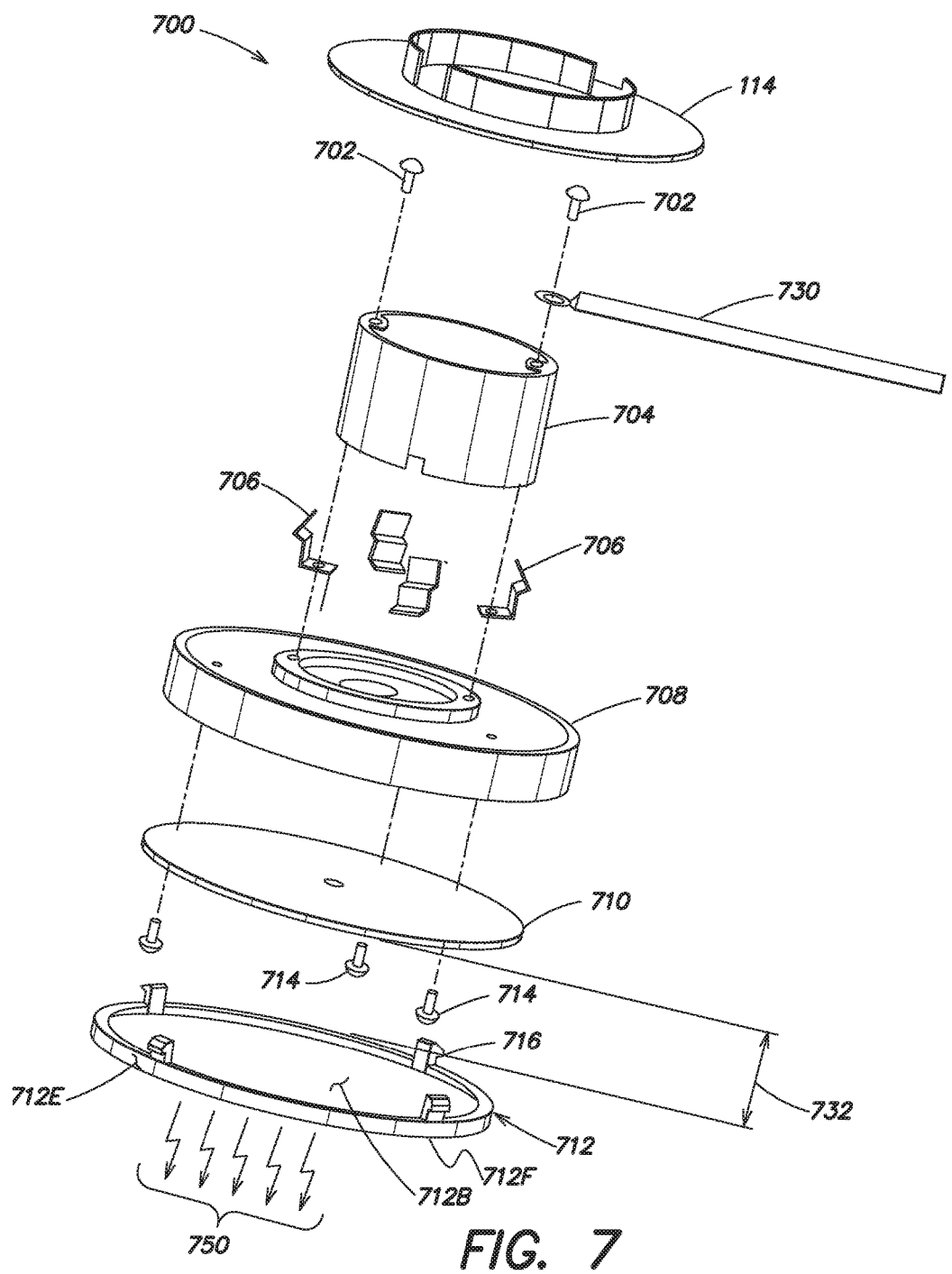
FIG. 7 is an assembly drawing of another example luminaire according to some implementations.

FIG. 7 is an assembly drawing of another example luminaire 700 according to some implementations pursuant to the concepts disclosed herein.

As shown in this example, luminaire 700 includes some of the same components as luminaire 100, and so repeated descriptions thereof are not included here. Meanwhile, differently from luminaire 100, luminaire 700 includes driver module cover 704 which can house a driver such as module 104 described above (although a driver 104 is not explicitly shown in FIG. 7, it should be appreciated that a driver may be included in some implementations based on FIG. 7, as discussed elsewhere herein in connection with other figures) . not shown). A light source housing 708, similar in some respects to the flange portion 116 of the housing 102 shown in FIG. 1, houses an LED board 710 and lens 712, which are mounted in housing 708 using screws 714 and friction fit clips 716, respectively. Light source housing 708 is further attached to driver module cover 704 using screws 702.

Driver module cover 704 and/or light source housing 708 according to implementations may be made of thermally conducting material, for example plastic comprising materials selected from a group consisting of semi-crystalline polyamides, polyamide alloys, polymers, minerals, glass, and carbon, or other materials such as carbon fiber, aluminum, steel, etc. In these and other implementations, insulator 704 and/or housing 708 may be formed by injection molding, extrusion or other means and dimensioned in accordance with driver 104 and LED board 710, respectively. It should be noted that although light source housing 708 is shown as having a round shape in this example, that this is not limiting, and many other shapes are possible such as squares, rectangles, ovals, etc. (e.g., as discussed further below in connection with FIGS. 8B, 12A and 12B)).

LED board 710 comprises a plurality of LEDs and an example will be described in more detail below. Lens 712 may be made of any optically transmissive material, including glass and hard plastics. For example, lens 712 may be comprised of polycarbonate material, such as Covestro Makrolon® (e.g., see www.plastics.covestro.com/en/Products/Makrolon). In implementations, lens 712 causes light from LEDs on LED board 710 to be distributed evenly across its downward facing surface by at least one of two approaches. In a first approach, the spacing of the LEDs is controlled so as to cause the resulting light to be uniform. In a second approach, lens 712 is formed using a plastic that includes additives that result in a milky white diffusive polymer.

More generally, in one implementation based on FIG. 7 (as well as features from other figures described herein), an LED lighting apparatus 700 comprises a housing 708, an LED board 710 coupled to the housing, and a lens 712 coupled to the housing. The lens has a back side 712B facing the LED board, a front side 712F opposite to the back side, and an outer edge 712E. The front side 712F of the lens provides a downward facing surface when the LED lighting apparatus is installed in an opening of a ceiling, and the lens is disposed with respect to the LED board such that multiple LEDs disposed on the LED board illuminate the back side of the lens.

Figure 9A:
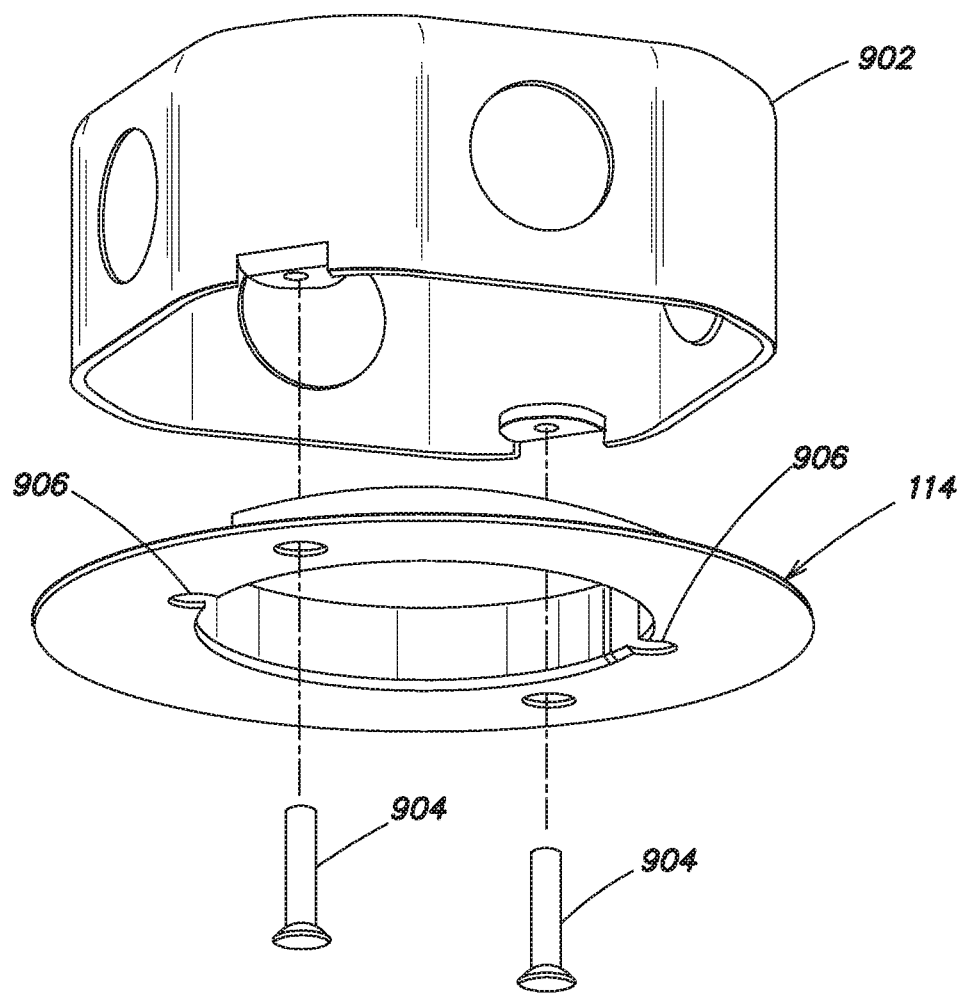
FIGS. 9A and 9B illustrate example aspects of installing a luminaire such as that shown in FIG. 7 into a junction box in a ceiling, according to some inventive implementations.
Figure 9B:
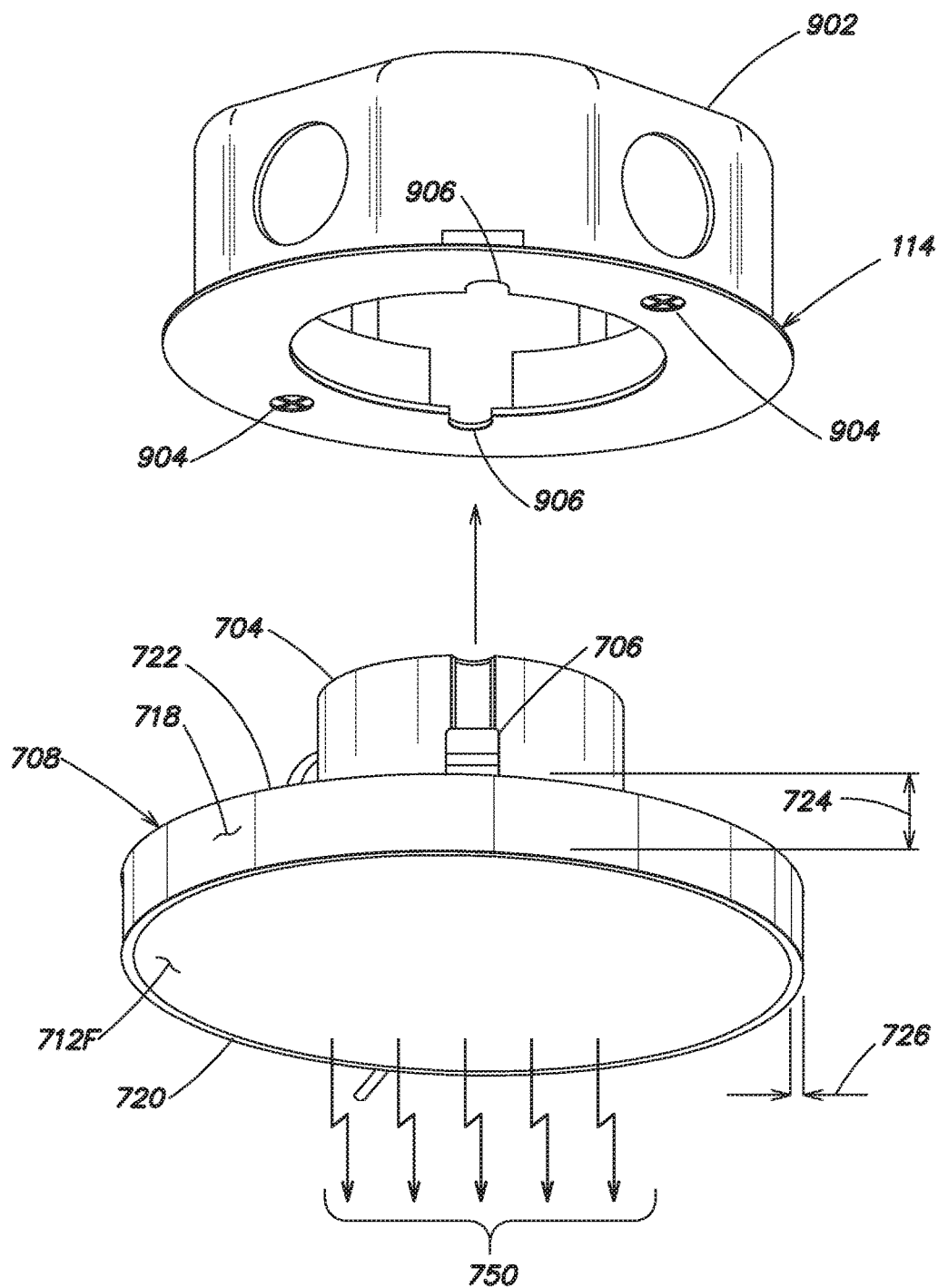

With reference for the moment to FIG. 9B, which shows a bottom or down-facing perspective view of the lighting apparatus 700 of FIG. 7 as it is installed in a junction box 902, the housing 708 of the lighting apparatus 700 comprises a sidewall 718 having a front facing edge 720 and a back facing edge 722 positioned adjacent to a ceiling when the LED lighting apparatus is installed in an opening of the ceiling. In one example implementation, a depth 724 of the sidewall 718, between the front facing edge 720 and the back facing edge 722, is less than one inch such that the apparatus does not visibly appear to protrude substantially from a surface of the ceiling when the apparatus is installed in an opening of the ceiling. In one aspect, the front side 712F of the lens, providing the downward facing surface when the LED lighting apparatus is installed in the opening in the ceiling, is essentially flush with the front facing edge 720 of the sidewall 718 of the housing 708. In another aspect, the front facing edge 720 of the sidewall 718 forms a perimeter around the outer edge 712E of the lens, wherein the perimeter around the outer edge of the lens is significantly thin so as not to extend significantly beyond the outer edge of the lens. In the foregoing manners, the lighting apparatus 700 has an appreciably thin profile (e.g., installed depth from the ceiling of less than one inch, and significantly thin perimeter around the outer edge of the lens) to provide an aesthetically pleasing architectural lighting component.

Figure 9C:
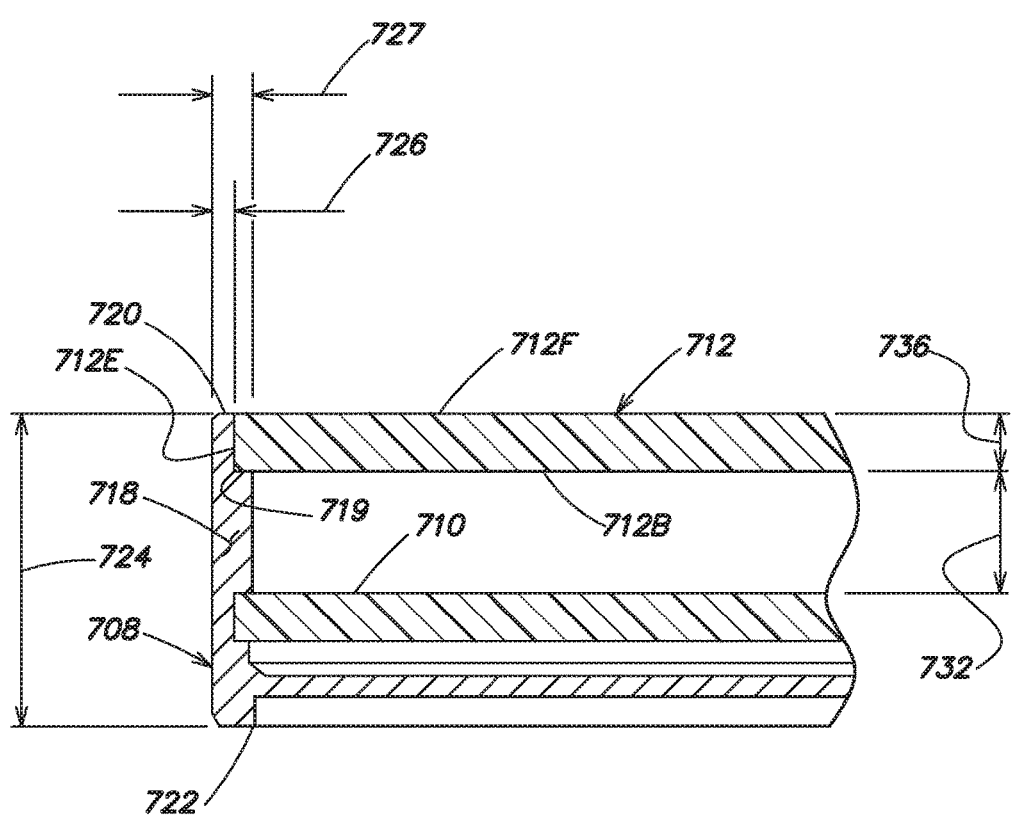
FIG. 9C is a partial side cross-sectional view of the luminaire of FIG. 7, illustrating an arrangement of an LED board and a lens disposed in a housing and example dimensions relating to same, according to some inventive implementations.

FIG. 9C is a partial side cross-sectional view of the luminaire of FIGS. 7 and 9B, illustrating an arrangement of the LED board 710 and the lens 712 disposed in the housing 708, and example dimensions relating to same, according to some inventive implementations. As shown in FIG. 9C, the outer edge 712E of the lens 712, when installed in the housing 708, is disposed in a rabbet 719 of the sidewall 718 of the housing that runs along the front facing edge 720 of the sidewall 718, such that an edge thickness 726 of the front facing edge 720 is smaller than a sidewall thickness 727 of the sidewall 718. In various examples, sidewall 718 may have a thickness 727 of less than 10 millimeters, in some examples less than 5 millimeters, and in other examples less than 3 millimeters. In other examples the front facing edge 720, forming the perimeter around the outer edge of the lens, may have a thickness 726 of less than two millimeters, and in some examples less than 1.5 millimeters. In one specific implementation, the thickness 726 is 1.2 millimeters and the thickness 727 is 2.1 millimeters.

As also shown in FIG. 9C, the housing 708 has a depth 724 between the front facing edge 720 and the back facing edge 722 of the sidewall 718, which in some inventive implementations is less than one inch, as discussed above. In another aspect, a lens thickness 736 of the lens 712 may be on the order of approximately 3 millimeters. In some implementations, a spacing 732 between the LED board 710 and the lens 712 may be particularly selected to cause the resulting light 750 from the downward facing surface of the lens (e.g., see FIG. 7) to be substantially uniform during operation of the apparatus. In yet another aspect, this spacing 732 may be approximately or equal to 8 millimeters.

Figure 8A:
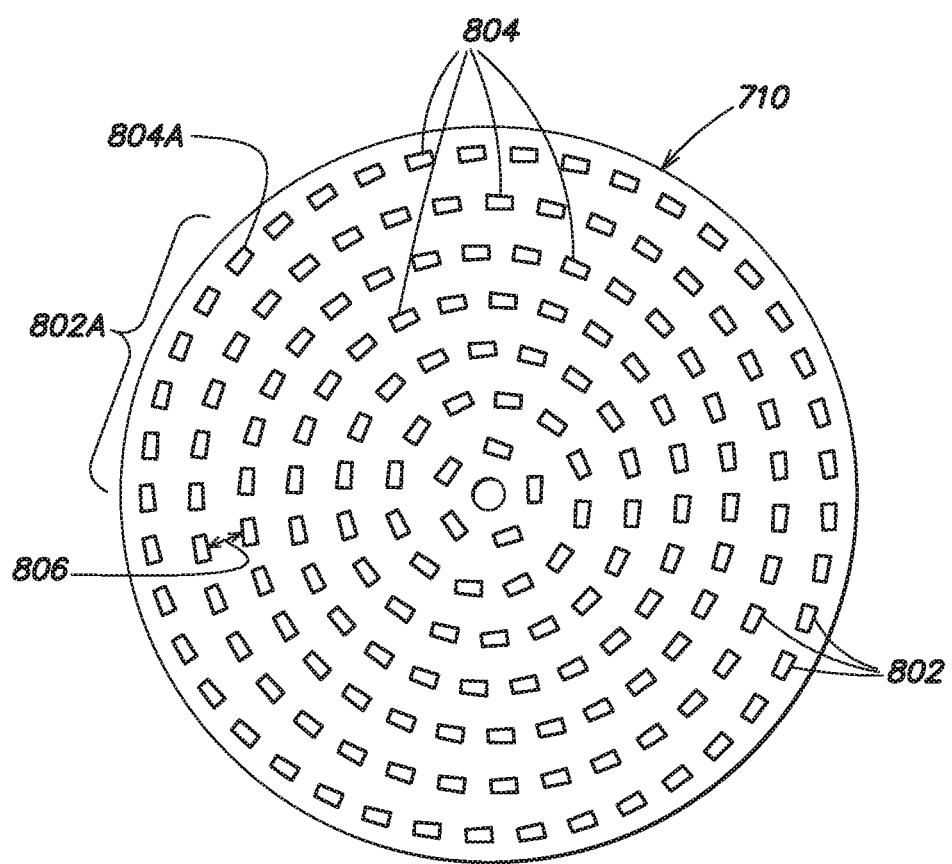
FIG. 8A illustrates an example circular LED board that can be included in a luminaire such as that illustrated in FIG. 7, according to some inventive implementations.
Figure 8B:
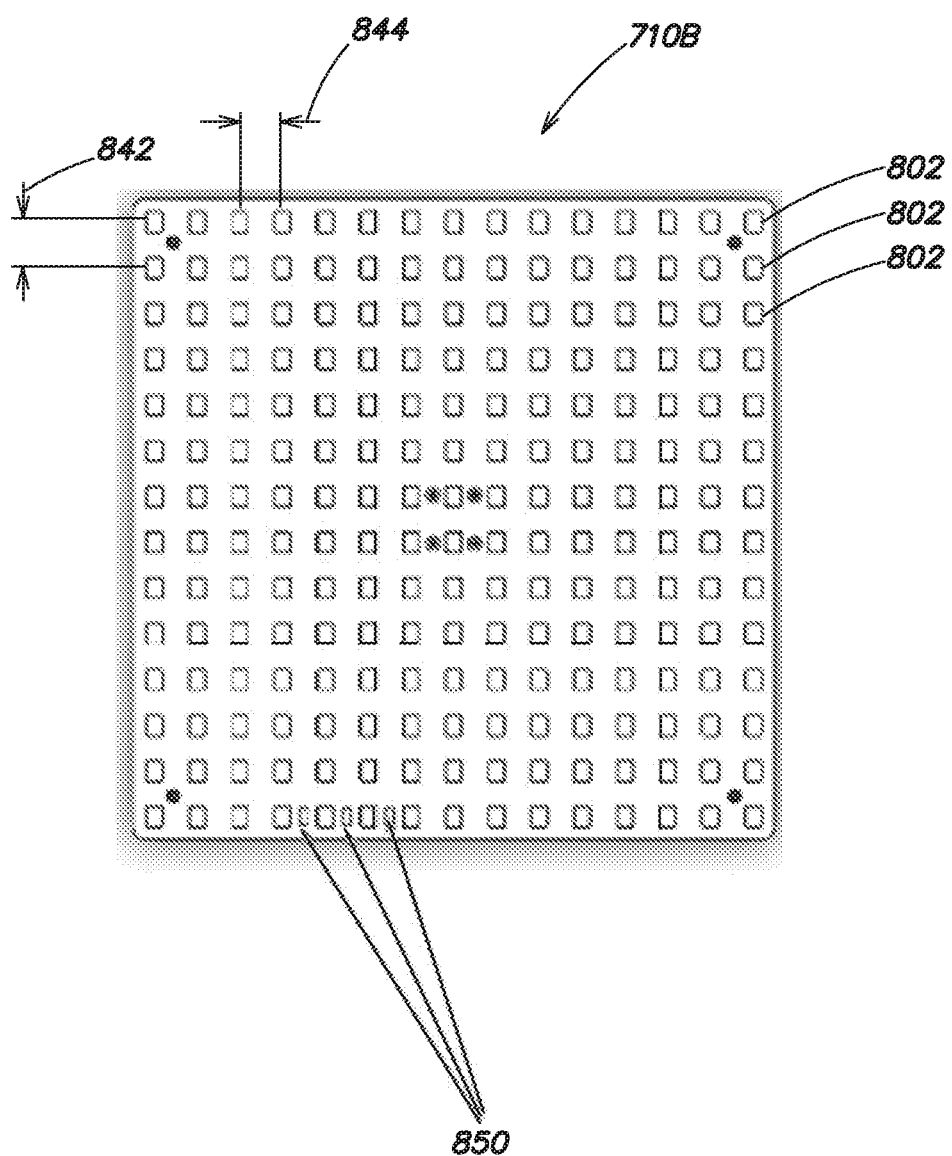
FIG. 8B illustrates an example rectangular LED board that can be included in a luminaire according to some inventive implementations.

FIG. 8A illustrates an example circular LED board 710 that can be included in a luminaire such as that illustrated in FIG. 7 according to some inventive implementations, and FIG. 8B illustrates an example rectangular LED board 710B that can be included in a luminaire according to other inventive implementations (e.g., as discussed further below in connection with FIGS. 12A and 12B). As a general premise for both of the LED boards shown respectively in FIGS. 8A and 8B, a spacing of the multiple LEDs 802 on the LED board causes the resulting light 750 from the downward facing surface of the lens (see FIG. 7) to be substantially uniform during operation of the apparatus. In another aspect, both the spacing of the LEDs 802 on the LED board, and the spacing 732 between the LED board 710 and the lens 712, contribute toward a substantially uniform distribution of the resulting light from the downward facing surface of the lens. In yet another aspect, the spacing of the LEDs 802 on the LED board, the spacing 732 between the LED board 710 and the lens 712, and the thickness 736 of the lens respectively contribute toward a substantially uniform distribution of the resulting light. In yet another aspect, the spacing of the LEDs on the LED board, the spacing 732 between the LED board 710 and the lens 712, the thickness 736 of the lens, and the type of material used in the lens (e.g., a milky white polycarbonate) respectively contribute toward a substantially uniform distribution of the resulting light.

In some inventive implementations, the LEDs are distributed uniformly on the LED board and spaced apart almost identically. With reference to FIG. 8A, the plurality of LEDs 802 are arranged on the LED board 710 as a plurality of concentric rings 804. In one aspect, a distance 806 between any two adjacent concentric rings of the plurality of concentric rings is the same or approximately the same. As shown in FIG. 8A, at least a first ring 804A of the plurality of concentric rings comprises a first group 802A of the plurality of LEDs, and respective LEDs of the first group are spaced substantially evenly around the first ring 804A. In some examples (e.g., as shown in FIG. 8A) each ring of the plurality of concentric rings may comprise a different group of the plurality of LEDs, and respective LEDs of each different group are spaced substantially evenly around a corresponding ring of the plurality of concentric rings. In one example, an LED-to-LED spacing of the plurality of LEDs on the LED board is in a range of from approximately 7.5 millimeters to 8.5 millimeters. In another example, a circular LED board 710 has a total of 165 LEDs 802.

With reference to FIG. 8B, the plurality of LEDs 802 on the rectangular LED board 710B are arranged substantially uniformly across an entire surface or substantially the entire surface of the LED board. In one example, an LED-to-LED distance between neighboring LEDs of the plurality of LEDs is in a range of from approximately 7.5 millimeters to 8.5 millimeters; in one example, a horizontal distance 844 between horizontally neighboring LEDS is 7.5 millimeters, and a vertical distance 842 between vertically neighboring LEDS is 8.1 millimeters. As also shown in FIG. 8B, the LED board 710B may also include one or more electrical traces terminating in electrical pads 850, which may be used, for example, in connection with the test button embodiments discussed above in connection with FIGS. 5 and 6, and discussed further below in connection with FIGS. 11A-E.

It should be noted that the number and spacing of LEDs 802 on the circular or rectangular LED boards shown in FIGS. 8A and 8B can depend on factors such as the amount of lumens produced by the LEDs, the type of lens 712, the desired overall light intensity of luminaire 700, etc. In other implementations, an excessive amount of lumens than necessary is produced by the LEDs. Each of LEDs 802 can be implemented by, for example an XLamp LED from Cree, OLEDs, or PLEDs.

FIGS. 9A and 9B illustrate aspects of how easily luminaire 700 according to implementations can be installed in an opening of a ceiling, for example.

As shown in FIG. 9A, first adapter ring 114 is attached to a junction box 902 using screws 904. The adapter ring 114 may include one or more cutouts 906 to facilitate coupling of the luminaire/lighting apparatus to the adapter ring, as discussed below in connection with FIG. 9B. The junction box 902 can be already installed above an opening in the ceiling. Although a standard 4×4 junction box is shown in FIG. 9A, it should be apparent that many other types of junction boxes can be used, such as a type of junction box similar to junction box 402 described above.

Next as shown in FIG. 9B, operating power can be connected to luminaire 700 using wires and connectors in the junction box 902 (not shown). Then luminaire 700 can be snapped into adapter ring 114 and held into place by friction fit clips 706. In one example, the friction fit clips 706 snap fit into the one or more cutouts 906 off the adapter ring 114. It should be noted that junction box 902 is preferably installed and positioned above the ceiling line such that, when luminaire 700 is snapped in place as described herein, light source housing 708 of luminaire 700 appears to be surface mounted to the ceiling, although luminaire 700 is actually held in place by clips 706 and adapter ring 114. Many other alternatives to friction fit clips are possible, such as spring clips, magnets, etc.

Figure 10A:
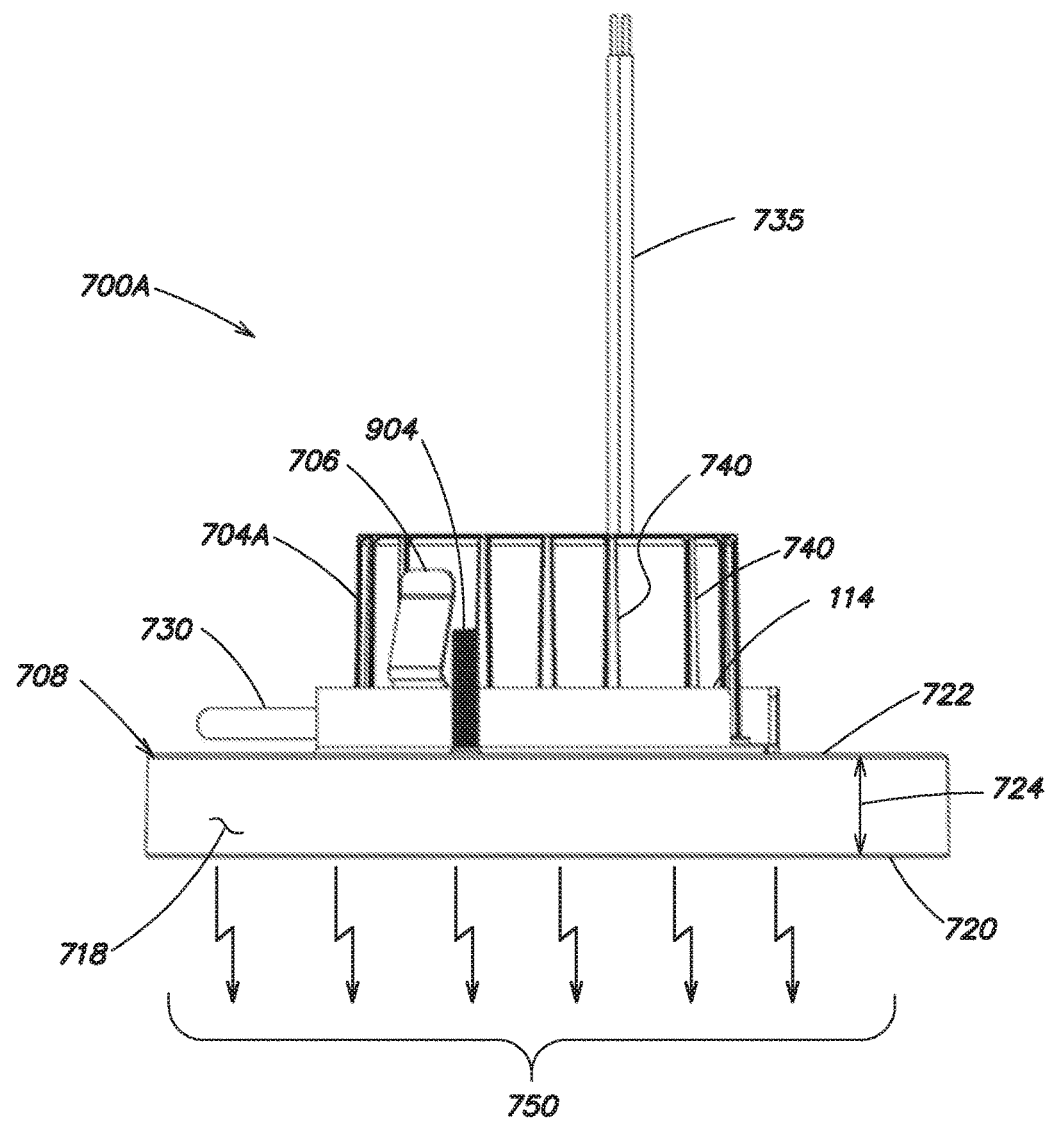
FIG. 10A is a side view of a luminaire similar to that shown in FIG. 7, according to some inventive implementations.
Figure 10B:
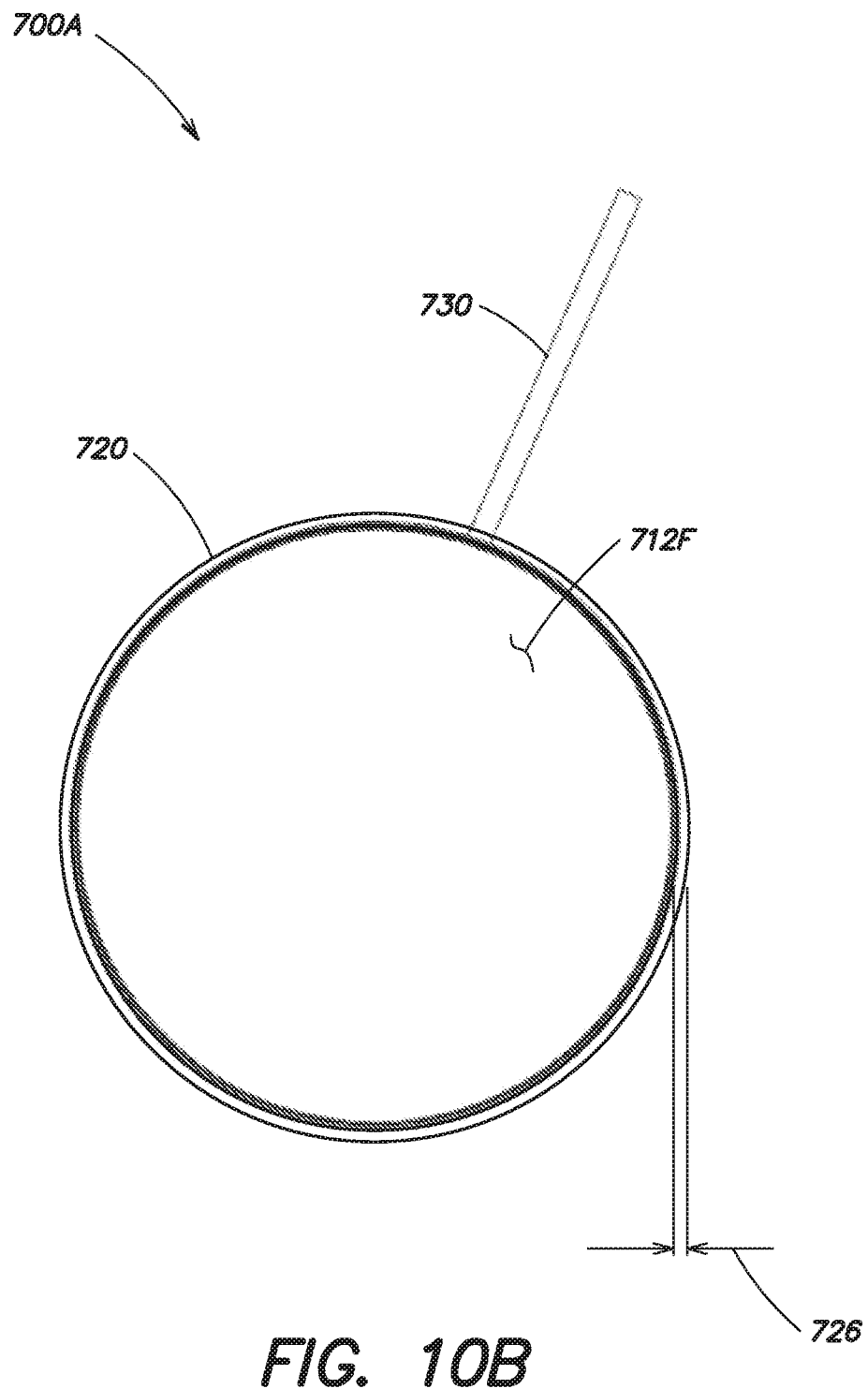
FIG. 10B is a front view (or downward facing view) of the luminaire shown in FIG. 10A.
Figure 10C:
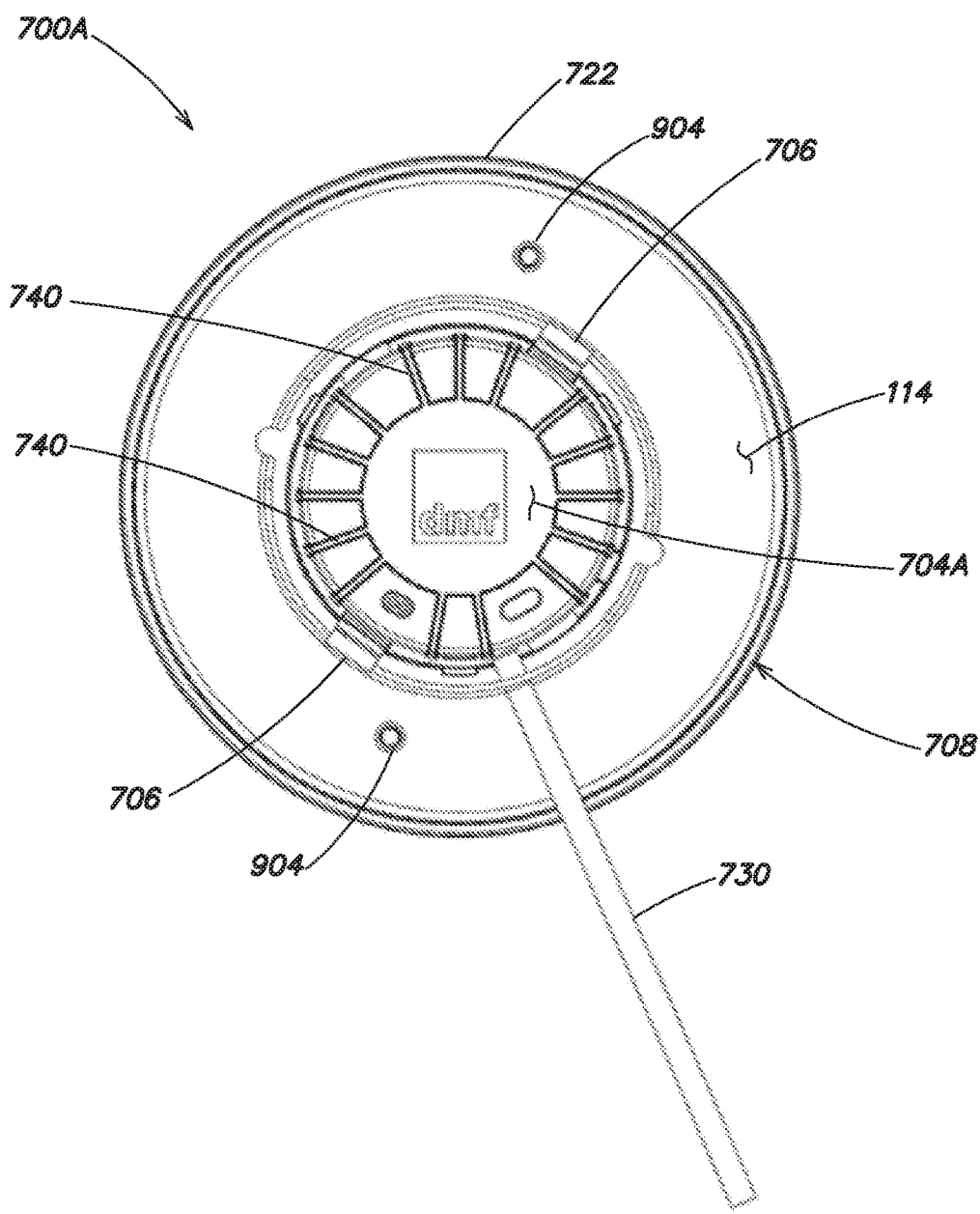
FIG. 10C is a back view (or upward facing view) of the luminaire shown in FIG. 10A.
Figure 10D:
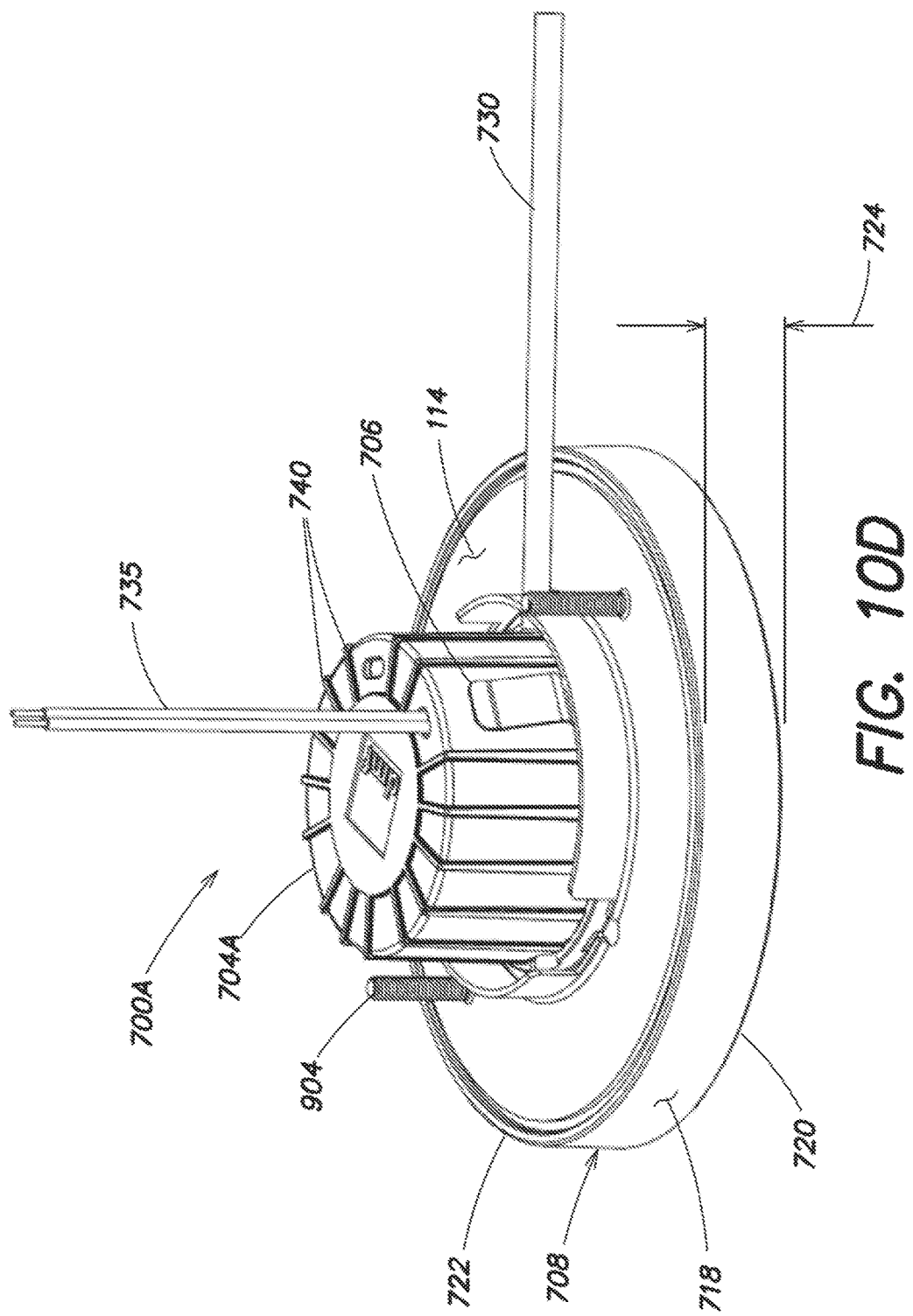
FIG. 10D is a back (or top) perspective view of the luminaire shown in FIG. 10A.
Figure 10E:
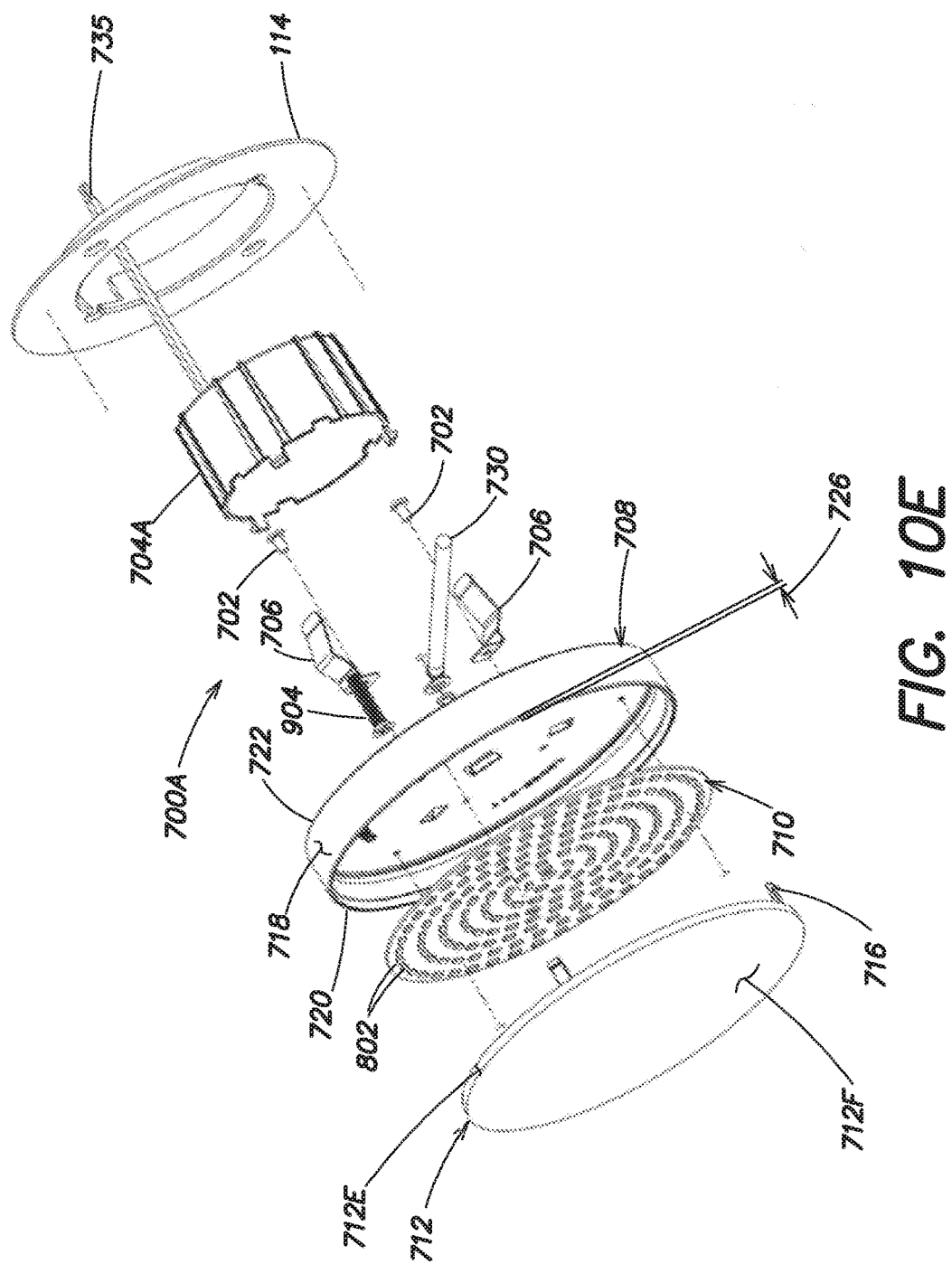
FIG. 10E is a front (or bottom) exploded perspective view of the luminaire shown in FIG. 10A.

FIG. 10A is a side view of a luminaire similar to that shown in FIG. 7, according to some inventive implementations. The luminaire 700A is substantially similar in multiple respects to the luminaire described above in connection with FIGS. 7 through 9. In one different aspect, the driver module cover 704 may include multiple fins 740 which, in some implementations, may facilitate heat dissipation from the luminaire. As shown in FIG. 10A, a ground wire 730 may be coupled to one or both of the housing 708 or the adapter ring 714, and operating power may be coupled to the luminaire via wires 735, to provide for a substantially uniform distribution of resulting light 750 from the luminaire during operation. FIG. 10B is a front view (or downward facing view) of the luminaire shown in FIG. 10A, showing the appreciably thin perimeter formed by the front facing edge 720 of the sidewall 718 of the housing (e.g., having a thickness 726 on the order of less than 10 millimeters, or less than five millimeters, or less than three millimeters, or less than two millimeters, or less than 1.5 millimeters). FIG. 10C is a back view (or upward facing view) of the luminaire shown in FIG. 10A, while FIG. 10D is a back (or top) perspective view of the luminaire shown in FIG. 10A and FIG. 10E is a front (or bottom) exploded perspective view of the luminaire shown in FIG. 10A.

Figure 11A:
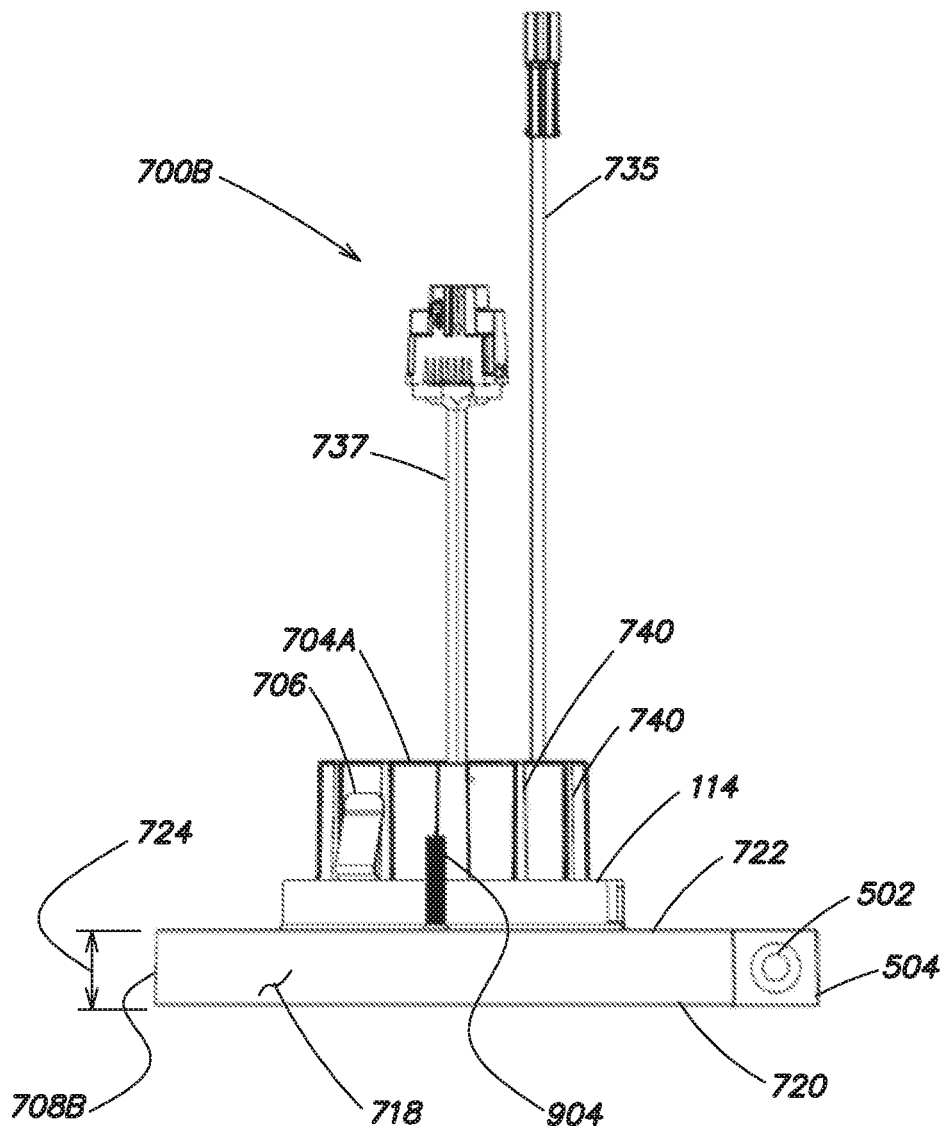
FIG. 11A is a side view of a luminaire similar to that shown in FIG. 7, according to some inventive implementations, which includes a test button similar to that shown in FIG. 5.
Figure 11B:
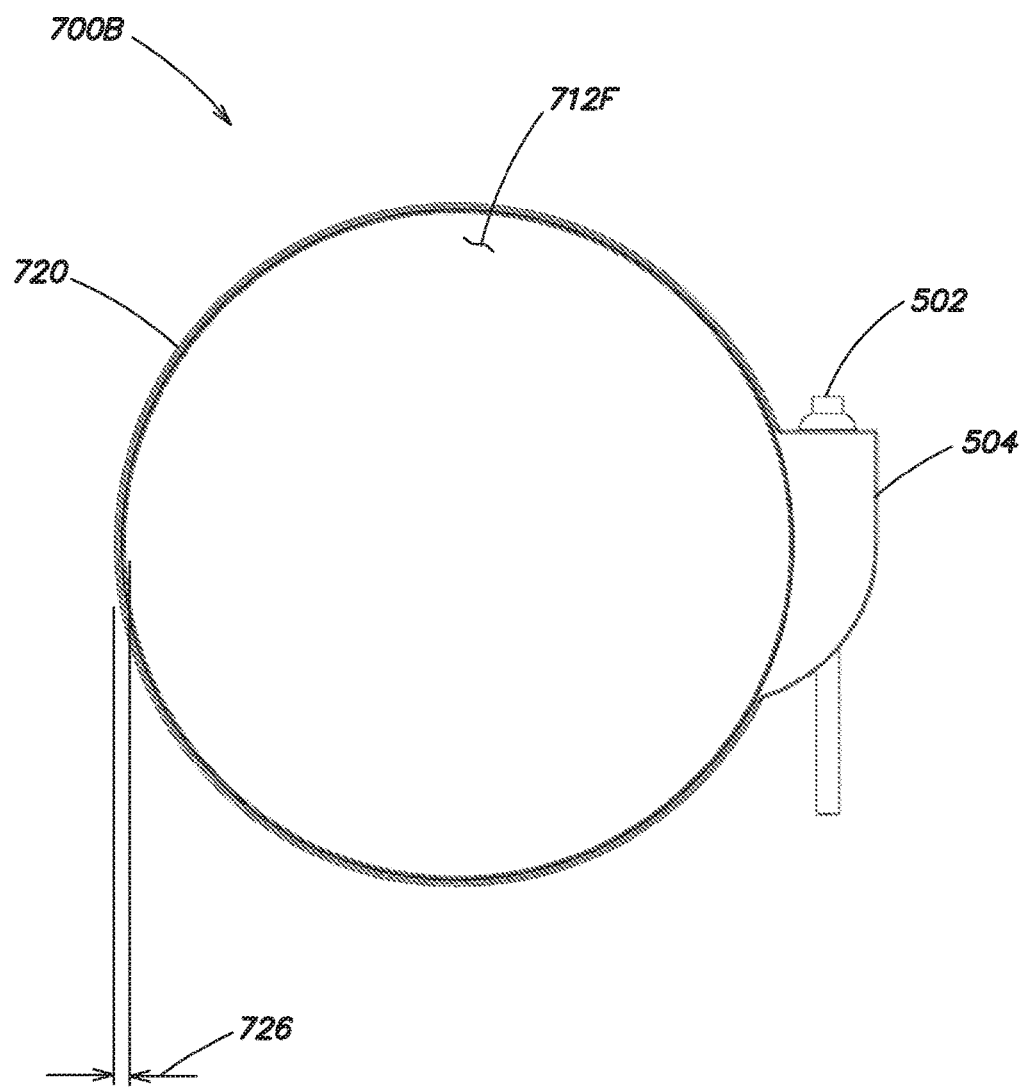
FIG. 11B is a front view (or downward facing view) of the luminaire shown in FIG. 11A.
Figure 11C:
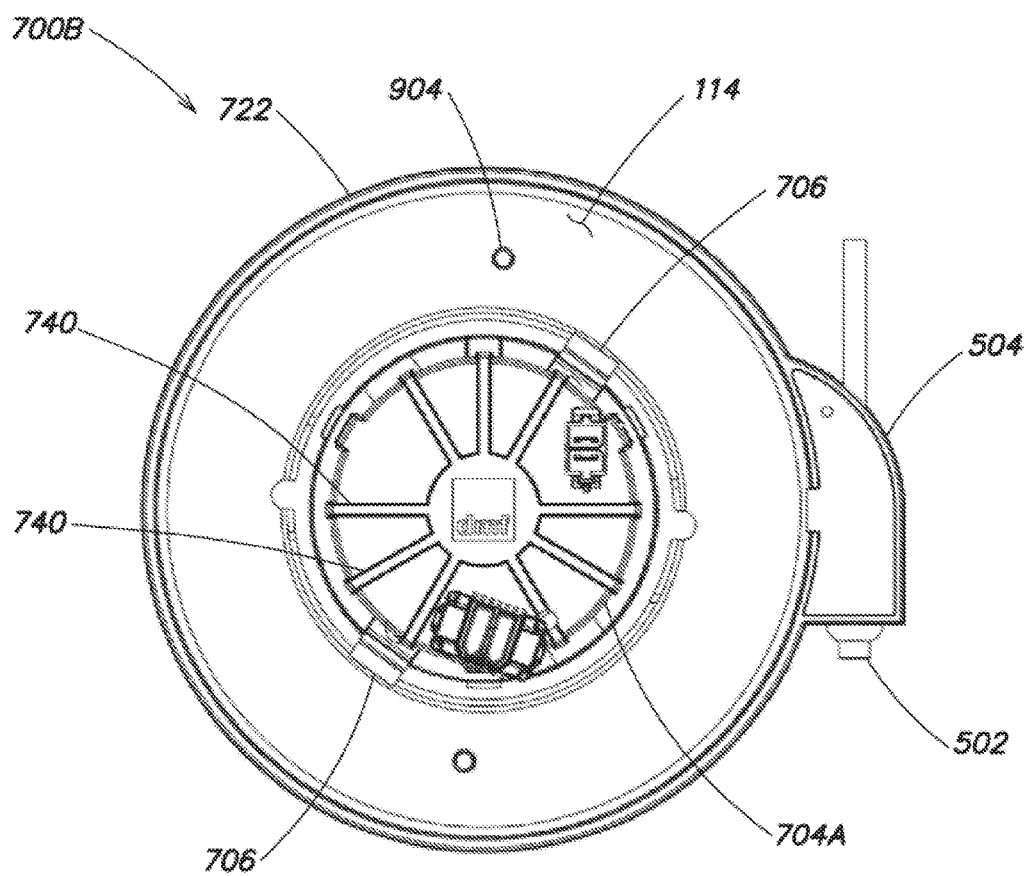
FIG. 11C is a back view (or upward facing view) of the luminaire shown in FIG. 11A.
Figure 11D:
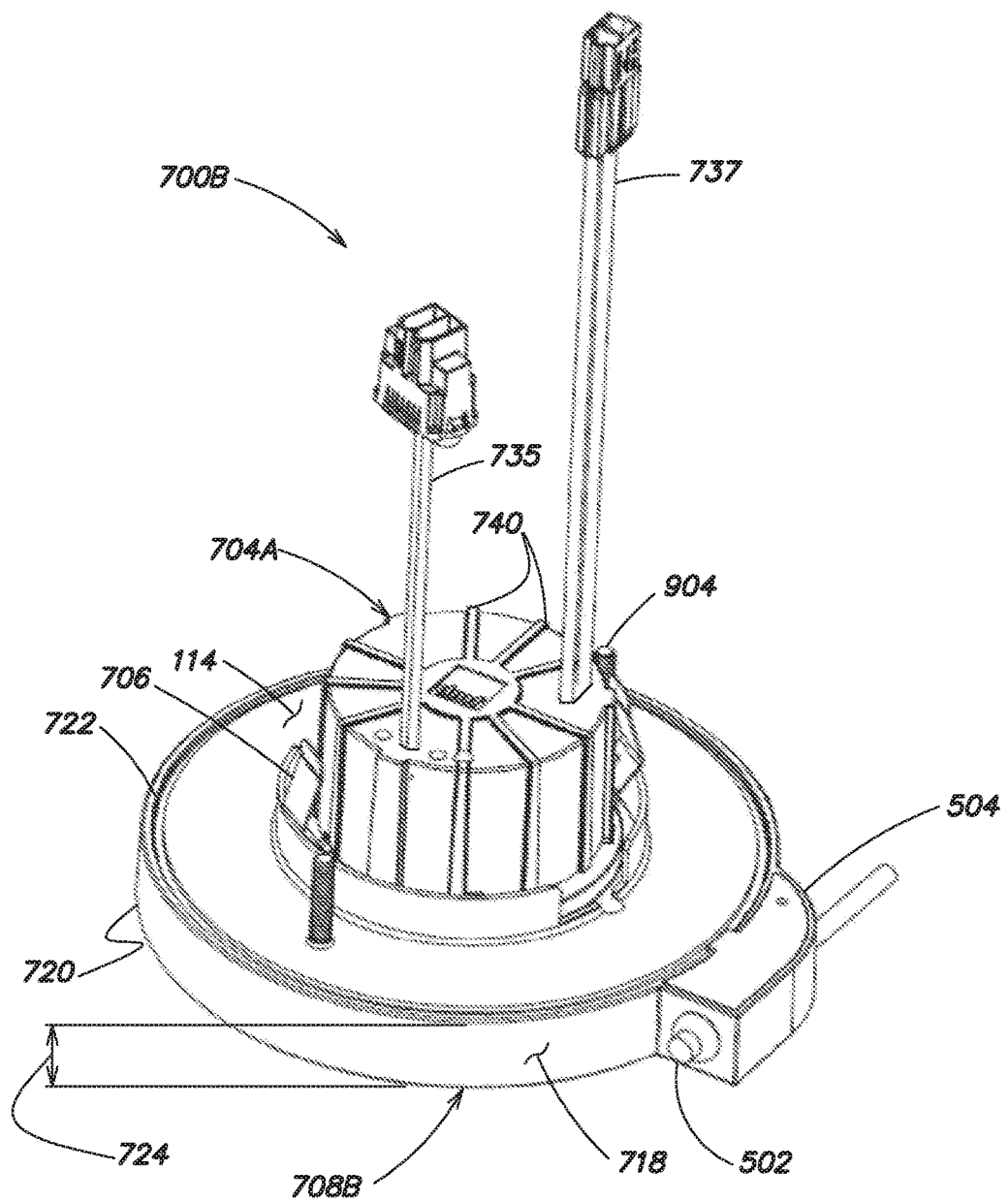
FIG. 11D is a back (or top) perspective view of the luminaire shown in FIG. 11A.
Figure 11E:
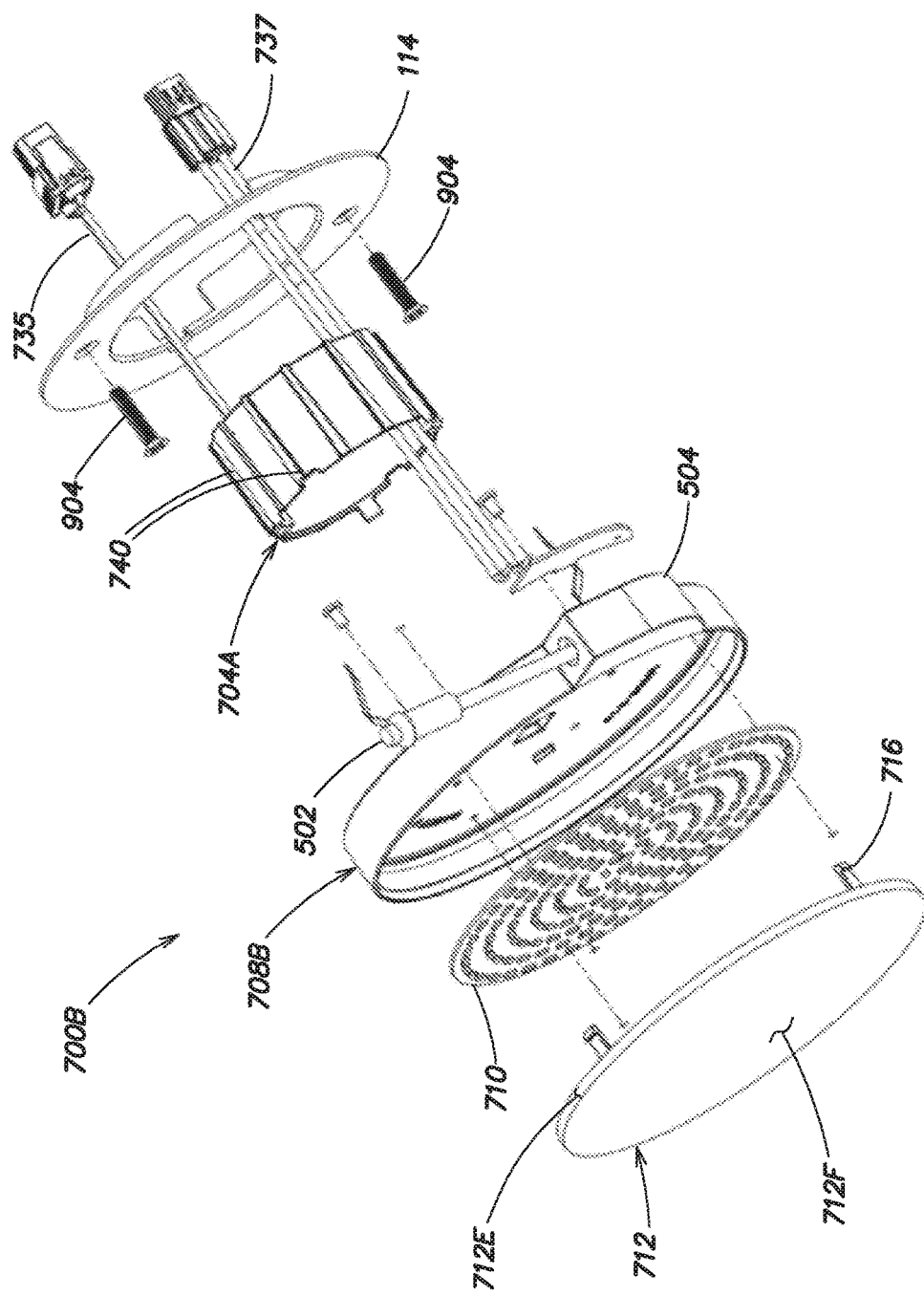
FIG. 11E is a front (or bottom) exploded perspective view of the luminaire shown in FIG. 11A.

It should be noted that other implementations of luminaire 700 can include a test button such as described above in connection with FIGS. 5 and 6, for example attached to light source housing 708 and connected to electrical wires as described above. In particular, the luminaire may comprise a test button, coupled to the at least one sidewall of the housing and at least one electrical wire, to provide an electrical signal on the at least one electrical wire upon activation of the test button. To this end, FIG. 11A is a side view of a luminaire similar to that shown in FIG. 7, according to some inventive implementations, which includes a test button similar to that shown in FIG. 5. FIG. 11B is a front view (or downward facing view) of the luminaire shown in FIG. 11A, FIG. 11C is a back view (or upward facing view) of the luminaire shown in FIG. 11A, FIG. 11D is a back (or top) perspective view of the luminaire shown in FIG. 11A, and FIG. 11E is a front (or bottom) exploded perspective view of the luminaire shown in FIG. 11A.

Figure 12A:
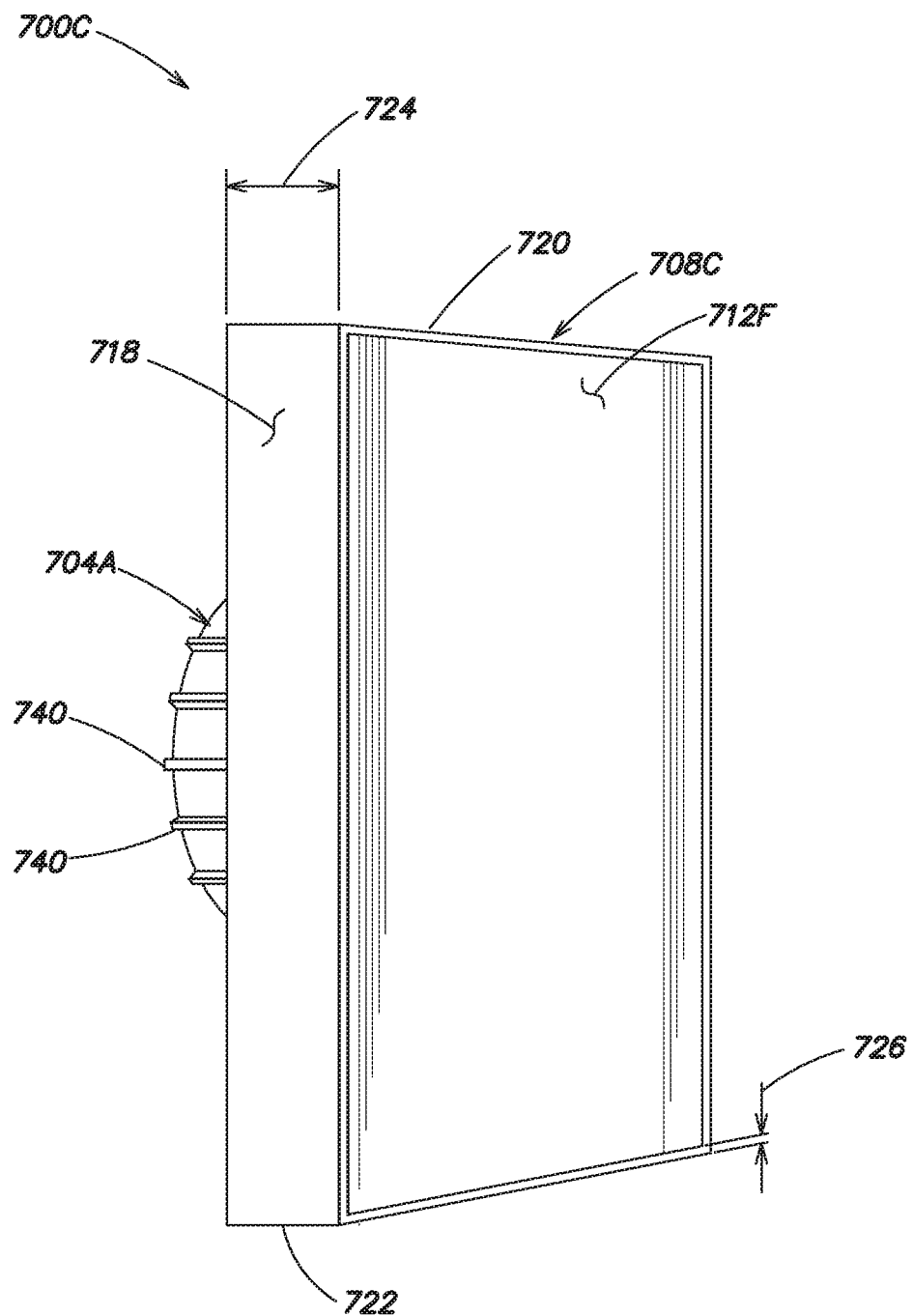
FIG. 12A is a front (or bottom) side perspective view of a rectangular-shaped luminaire according to some inventive implementations.
Figure 12B:
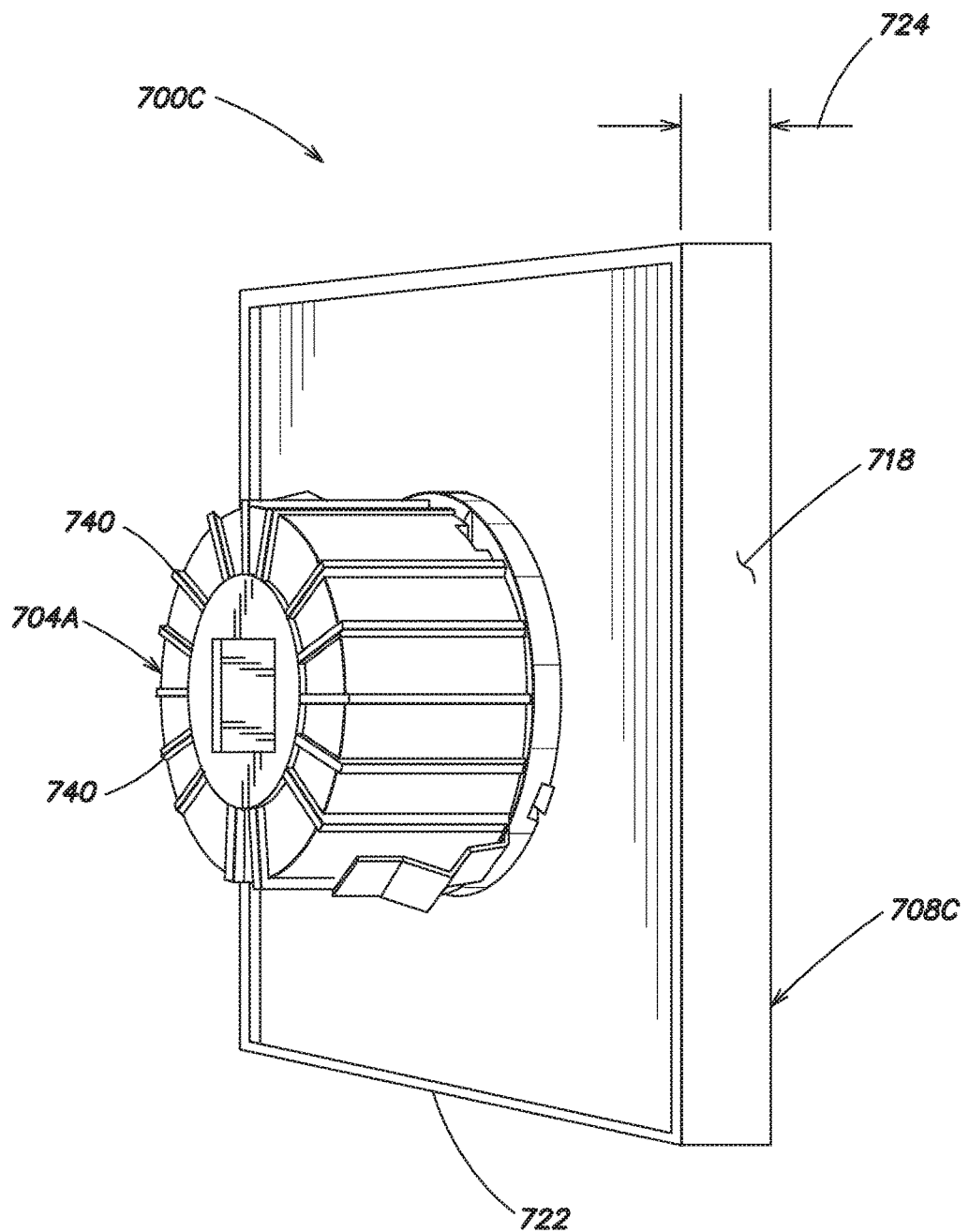
FIG. 12B is a back (or top) side perspective view of the luminaire of FIG. 12A according to some inventive implementations.

FIG. 12A is a front (or bottom) side perspective view of a rectangular-shaped luminaire 700C according to some inventive implementations, and FIG. 12B is a back (or top) side perspective view of the luminaire of FIG. 12A according to some inventive implementations. The luminaire shown in FIGS. 12A and 12B may employ the rectangular LED board 710B as shown and discussed above in connection with FIG. 8B. In other aspects, the luminaire 700C may share one or more features or attributes as discussed above in connection with the circular luminaires; for example, the housing 708C of the luminaire may have a depth 724 of sidewalls 718 on the order of less than one inch, and a perimeter thickness 726 of the front facing edge 720 of the housing sidewalls, constituting a perimeter around the front face 712F of the lens 112, may be on the order of less than 10 millimeters, or less than 5 millimeters, or less than 3 millimeters, or less than 2 millimeters, or less than 1.5 millimeters.

Although the present implementations have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

CONCLUSION

Those skilled in the relevant arts will readily appreciate that all parameters, dimensions, materials, and configurations described herein are meant to be exemplary and that the actual parameters, dimensions, materials, and/or configurations may depend upon the specific application or applications for which the inventive teachings is/are used. It is to be understood that the foregoing implementations are presented primarily by way of example and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method. The acts performed as part of the method may be ordered in any suitable way. Accordingly, implementations may be constructed in which acts are performed in an order different than illustrated, which may include performing some acts simultaneously, even though shown as sequential acts in illustrative implementations.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:
1. An LED lighting apparatus, comprising:
a housing comprising at least one sidewall having a front facing edge and a back facing edge positioned adjacent to a ceiling when the LED lighting apparatus is installed in an opening of the ceiling, wherein a depth of the at least one sidewall of the housing, between the front facing edge and the back facing edge, is less than one inch such that the apparatus does not visibly appear to protrude substantially from a surface of the ceiling when the apparatus is installed in the opening of the ceiling;
an LED board coupled to the housing, the LED board comprising a plurality of LEDs; and
a lens coupled to the housing, the lens having a back side facing the LED board and a front side opposite to the back side, wherein the front side of the lens provides a downward facing surface when the LED lighting apparatus is installed in the opening of the ceiling, the lens being disposed with respect to the LED board such that the plurality of the LEDs illuminate the back side of the lens,
wherein:
a first spacing of the plurality of the LEDs on the LED board causes resulting light from the downward facing surface of the lens to be substantially uniform during operation of the apparatus; and
the front side of the lens, providing the downward facing surface when the LED lighting apparatus is installed in the opening in the ceiling, is essentially flush with the front facing edge of the at least one sidewall of the housing.

2. The apparatus of claim 1, wherein a second spacing between the LED board and the lens further causes the resulting light from the downward facing surface of the lens to be substantially uniform during operation of the apparatus.

3. The apparatus of claim 2, wherein the second spacing is approximately or equal to eight millimeters.

4. The apparatus of claim 1, wherein a thickness of the at least one sidewall is less than ten millimeters.

5. The apparatus of claim 1, wherein a thickness of the at least one sidewall is less than five millimeters.

6. The apparatus of claim 1, wherein a thickness of the at least one sidewall is less than three millimeters.

7. The apparatus of claim 6, wherein an edge thickness of the front facing edge of the at least one sidewall is less than two millimeters.

8. The apparatus of claim 6, wherein an edge thickness of the front facing edge of the at least one sidewall is less than 1.5 millimeters.

9. The apparatus of claim 1, wherein the lens includes friction fit clips to mount the lens in the housing.

10. The apparatus of claim 1, wherein the plurality of LEDs are distributed uniformly on the LED board and spaced apart almost identically.

11. The apparatus of claim 10, wherein an LED-to-LED spacing of the plurality of LEDs on the LED board is in a range of from approximately 7.5 millimeters to 8.5 millimeters.

12. The apparatus of claim 10, wherein the lens is a milky white diffusive polymer.

13. The apparatus of claim 12, wherein the lens includes Makrolon® polycarbonate.

14. The apparatus of claim 12, wherein the lens has a thickness of approximately or equal to three millimeters.

15. The apparatus of claim 1, wherein:
the LED board is circular; and
the plurality of LEDs are arranged on the LED board as a plurality of concentric rings.

16. The apparatus of claim 15, wherein a distance between any two adjacent concentric rings of the plurality of concentric rings is the same or approximately the same.

17. The apparatus of claim 16, wherein:
at least a first ring of the plurality of concentric rings comprises a first group of the plurality of LEDs; and
respective LEDs of the first group are spaced substantially evenly around the first ring of the plurality of concentric rings.

18. The apparatus of claim 17, wherein:
each ring of the plurality of concentric rings comprises a different group of the plurality of LEDs; and
respective LEDs of each different group are spaced substantially evenly around a corresponding ring of the plurality of concentric rings.

19. The apparatus of claim 18, wherein the lens is a milky white diffusive polymer.

20. The apparatus of claim 15, wherein:
at least a first ring of the plurality of concentric rings comprises a first plurality of LEDs; and
respective LEDs of the first plurality of LEDs are spaced substantially evenly around the first ring of the plurality of concentric rings.

21. The apparatus of claim 20, wherein:
each ring of the plurality of concentric rings comprises a different group of the plurality of LEDs; and
respective LEDs of each different group are spaced substantially evenly around a corresponding ring of the plurality of concentric rings.

22. The apparatus of claim 21, wherein the lens is a milky white diffusive polymer.

23. The apparatus of claim 1, wherein:
the LED board is rectangular; and
the plurality of LEDs are arranged substantially uniformly across an entire surface or substantially the entire surface of the LED board.

24. The apparatus of claim 23, wherein an LED-to-LED distance between neighboring LEDs of the plurality of LEDs is in a range of from approximately 7.5 millimeters to 8.5 millimeters.

25. The apparatus of claim 24, wherein the lens is a milky white diffusive polymer.

26. The apparatus of claim 1, wherein
a second spacing between the LED board and the lens further causes the resulting light from the downward facing surface of the lens to be substantially uniform during operation of the apparatus;
the second spacing is approximately or equal to eight millimeters;
a thickness of the at least one sidewall is less than three millimeters;
the plurality of LEDs are distributed uniformly on the LED board and spaced apart almost identically;
an LED-to-LED spacing of the plurality of LEDs on the LED board is in a range of from approximately 7.5 millimeters to 8.5 millimeters;
the lens is a milky white diffusive polymer; and
the lens has a thickness of approximately or equal to three millimeters.

27. The apparatus of claim 1, further comprising a plurality of friction fit clips to couple the apparatus to a junction box.

28. The apparatus of claim 27, in combination with an adapter ring to couple the apparatus to the junction box, wherein:
the adapter ring is attached to the junction box; and
the apparatus is snapped into the adapter ring via the plurality of friction fit clips.

29. The combination of claim 28, further comprising the junction box.

30. The apparatus of claim 1, further comprising:
a test button, coupled to the at least one sidewall of the housing and at least one electrical wire, to provide an electrical signal on the at least one electrical wire upon activation of the test button.

* * * * *

US010488000C1

(12) EX PARTE REEXAMINATION CERTIFICATE (11931st)
United States Patent
Danesh et al.

(10) Number: US 10,488,000 C1
(45) Certificate Issued: *Oct. 25, 2021

(54) THIN PROFILE SURFACE MOUNT LIGHTING APPARATUS

(71) Applicant: DMF, Inc., Carson, CA (US)

(72) Inventors: Michael D. Danesh, Carson, CA (US); Vincent Williams, Torrance, CA (US); Mark Jongewaard, Westminster, CO (US)

(73) Assignee: DMF, INC., Carson, CA (US)

Reexamination Request:
No. 90/014,601, Oct. 30, 2020

Reexamination Certificate for:
Patent No.: 10,488,000
Issued: Nov. 26, 2019
Appl. No.: 16/016,040
Filed: Jun. 22, 2018

( * ) Notice: This patent is subject to a terminal disclaimer.

Related U.S. Application Data

(63) Continuation-in-part of application No. 29/648,046, filed on May 17, 2018, now Pat. No. Des. 905,327.

(60) Provisional application No. 62/552,126, filed on Aug. 30, 2017, provisional application No. 62/523,640, filed on Jun. 22, 2017.

(51) Int. Cl.
| | |
|---|---|
| F21S 8/04 | (2006.01) |
| F21K 9/68 | (2016.01) |
| F21S 8/00 | (2006.01) |
| F21V 21/088 | (2006.01) |
| F21S 8/02 | (2006.01) |
| F21S 9/02 | (2006.01) |
| F21V 29/87 | (2015.01) |
| F21Y 105/18 | (2016.01) |
| F21Y 105/16 | (2016.01) |
| F21Y 115/10 | (2016.01) |
| F21V 21/04 | (2006.01) |
| F21V 23/04 | (2006.01) |
| F21V 8/00 | (2006.01) |

(52) U.S. Cl.
CPC ............... *F21S 8/043* (2013.01); *F21K 9/68* (2016.08); *F21S 8/026* (2013.01); *F21S 8/03* (2013.01); *F21S 9/022* (2013.01); *F21V 21/088* (2013.01); *F21V 21/047* (2013.01); *F21V 23/04* (2013.01); *F21V 29/87* (2015.01); *F21Y 2105/16* (2016.08); *F21Y 2105/18* (2016.08); *F21Y 2115/10* (2016.08); *G02B 6/0021* (2013.01); *G02B 6/0031* (2013.01)

(58) Field of Classification Search
None
See application file for complete search history.

(56) References Cited

To view the complete listing of prior art documents cited during the proceeding for Reexamination Control Number 90/014,601, please refer to the USPTO's public Patent Application Information Retrieval (PAIR) system under the Display References tab.

*Primary Examiner* — James A Menefee

(57) ABSTRACT

A thin profile surface mount LED lighting apparatus includes a housing, an LED board including multiple uniformly distributed LEDs, and a lens. The lens has a back side facing the LED board and a front side that provides a downward facing surface when the LED lighting apparatus is installed in an opening of a ceiling. The lens is disposed with respect to the LED board such that the LEDs illuminate the back side of the lens. A first spacing of the LEDs causes resulting light from the downward facing surface of the lens to be substantially uniform during operation of the apparatus. In one example, a thin front edge of a sidewall of the housing, forming a perimeter around the lens, is flush with the lens and is appreciably thin (e.g., a thickness of less than three millimeters), and a depth of the sidewall housing is less than one inch.

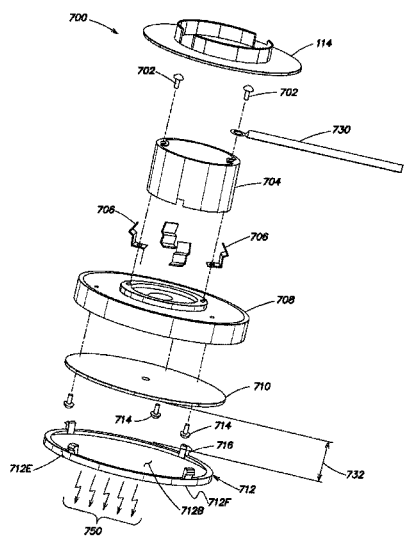

US 10,488,000 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 29 is cancelled.

Claims 1, 21, 26 are determined to be patentable as amended.

New claims 31-43 are added and determined to be patentable.

Claims 2-20, 22-25, 27, 28 and 30 were not reexamined.

1. An LED lighting apparatus comprising:
a housing comprising at least one sidewall having a front facing edge and a back facing edge positioned adjacent to a ceiling when the LED lighting apparatus is installed in an opening of the ceiling, wherein a depth of the at least one sidewall of the housing, between the front facing edge and the back facing edge, is less than one inch such that the apparatus does not visibly appear to protrude substantially from a surface of the ceiling when the apparatus is installed in the opening of the ceiling;
an LED board coupled to the housing, the LED board comprising a plurality of LEDs; and
a lens coupled to the housing, the lens having a back side facing the *plurality of LEDs on the* LED board and a front side opposite to the back side, wherein the front side of the lens provides a downward facing surface when the LED lighting apparatus is installed in the opening of the ceiling, the lens being disposed with respect to the LED board such that the plurality of the LEDs *are positioned directly opposite to the back side of the lens and* illuminate the back side of the lens, wherein:
a first spacing of the plurality of the LEDs on the LED board causes resulting light [from] *at or near* the downward facing surface of the lens to be substantially uniform during operation of the apparatus; and
the front side of the lens, providing the downward facing surface when the LED lighting apparatus is installed in the opening in the ceiling, is essentially flush with the front facing edge of the at least one sidewall of the housing.

21. [The apparatus of claim 20, wherein:] *An LED lighting apparatus, comprising:*
*a housing comprising at least one sidewall having a front facing edge and a back facing edge positioned adjacent to a ceiling when the LED lighting apparatus is installed in an opening of the ceiling, wherein a depth of the at least one sidewall of the housing, between the front facing edge and the back facing edge, is less than one inch such that the apparatus does not visibly appear to protrude substantially from a surface of the ceiling when the apparatus is installed in the opening of the ceiling;*
*an LED board coupled to the housing, the LED board comprising a plurality of LEDs; and*
*a lens coupled to the housing, the lens having a back side facing the plurality of LEDs on the LED board and a front side opposite to the back side, wherein the front side of the lens provides a downward facing surface when the LED lighting apparatus is installed in the opening of the ceiling, the lens being disposed with respect to the LED board such that the plurality of the LEDs are positioned directly opposite to the back side of the lens and illuminate the back side of the lens,*
wherein:
*a first spacing of the plurality of the LEDs on the LED board causes resulting light at or near the downward facing surface of the lens to be substantially uniform during operation of the apparatus;*
*the front side of the lens, providing the downward facing surface when the LED lighting apparatus is installed in the opening in the ceiling, is essentially flush with the front facing edge of the at least one sidewall of the housing;*
*the LED board is circular;*
*the plurality of LEDs are arranged on the LED board as a plurality of concentric rings;*
*at least a first ring of the plurality of concentric rings comprises a first plurality of LEDs;*
*respective LEDs of the first plurality of LEDs are spaced substantially evenly around the first ring of the plurality of concentric rings;*
each ring of the plurality of concentric rings comprises a different group of the plurality of LEDs; and
respective LEDs of each different group are spaced substantially evenly around a corresponding ring of the plurality of concentric rings.

26. [The apparatus of claim 1, wherein] *An LED lighting apparatus, comprising:*
a housing comprising at least one sidewall having a front facing edge and a back facing edge positioned adjacent to a ceiling when the LED lighting apparatus is installed in an opening of the ceiling, wherein a depth of the at least one sidewall of the housing, between the front facing edge and the back facing edge, is less than one inch such that the apparatus does not visibly appear to protrude substantially from a surface of the ceiling when the apparatus is installed in the opening of the ceiling;
an LED board coupled to the housing, the LED board comprising a plurality of LEDs; and
a lens coupled to the housing, the lens having a back side facing the LED board and a front side opposite to the back side, wherein the front side of the lens provides a downward facing surface when the LED lighting apparatus is installed in the opening of the ceiling, the lens being disposed with respect to the LED board such that the plurality of the LEDs illuminate the back side of the lens,
wherein:
a first spacing of the plurality of the LEDs on the LED board causes resulting light from the downward facing surface of the lens to be substantially uniform during operation of the apparatus;
the front side of the lens, providing the downward facing surface when the LED lighting apparatus is installed in the opening in the ceiling, is essentially flush with the front facing edge of the at least one sidewall of the housing;
a second spacing between the LED board and the lens further causes the resulting light from the downward facing surface of the lens to be substantially uniform during operation of the apparatus;
the second spacing is approximately or equal to eight millimeters;
a thickness of the at least one sidewall is less than three millimeters;
the plurality of LEDs are distributed uniformly on the LED board and spaced apart almost identically;
an LED-to-LED spacing of the plurality of LEDs on the LED board is in a range of from approximately 7.5 millimeters to 8.5 millimeters;
the lens is a milky white diffusive polymer; and
the lens has a thickness of approximately or equal to three millimeters.

31. The apparatus of claim 1, wherein the front side of the lens is coplanar with the front facing edge of the at least one sidewall of the housing.

32. The apparatus of claim 1, wherein the lens is flat.

33. The apparatus of claim 1, wherein the front side of the lens is plane-parallel to the back side of the lens.

34. The apparatus of claim 1, wherein the at least one sidewall is perpendicular to the downward facing surface.

35. A method of operating an LED lighting apparatus positioned on a ceiling, the LED apparatus comprising:
a housing comprising at least one sidewall having a front facing edge and a back facing edge positioned adjacent to a ceiling when the LED lighting apparatus is installed in an opening of the ceiling, wherein a depth of the at least one sidewall of the housing, between the front facing edge and the back facing edge, is less than one inch such that the apparatus does not visibly appear to protrude substantially from a surface of the ceiling when the apparatus is installed in the opening of the ceiling;
an LED board coupled to the housing, the LED board comprising a plurality of LEDs; and
a lens coupled to the housing, the lens having a back side facing the plurality of LEDs on the LED board and a front side opposite to the back side, wherein the front side of the lens provides a downward facing surface when the LED lighting apparatus is installed in the opening of the ceiling, the lens being disposed with respect to the LED board such that the plurality of the LEDs are positioned directly opposite to the back side of the lens and illuminate the back side of the lens; wherein:
a first spacing of the plurality of the LEDs on the LED board causes resulting light at or near the downward facing surface of the lens to be substantially uniform during operation of the apparatus; and
the front side of the lens, providing the downward facing surface when the LED lighting apparatus is installed in the opening in the ceiling, is essentially flush with the front facing edge of the at least one sidewall of the housing;
the method comprising:
generating substantially uniform light at the downward facing surface.

36. An LED lighting apparatus, comprising:
a housing comprising at least one sidewall having a front facing edge and a back facing edge positioned adjacent to a ceiling when the LED lighting apparatus is installed in an opening of the ceiling, wherein a depth of the at least one sidewall of the housing, between the front facing edge and the back facing edge, is less than one inch such that the apparatus does not visibly appear to protrude substantially from a surface of the ceiling when the apparatus is installed in the opening of the ceiling;
an LED board coupled to the housing, the LED board comprising a plurality of LEDs; and
a lens coupled to the housing, the lens having a back side facing the plurality of LEDs on the LED board and a front side opposite to the back side, wherein the front side of the lens provides a downward facing surface when the LED lighting apparatus is installed in the opening of the ceiling, the lens being disposed with respect to the LED board such that the plurality of the LEDs are positioned directly opposite to the back side of the lens and illuminate the back side of the lens;
wherein:
a first spacing of the plurality of the LEDs on the LED board causes resulting light at or near the downward facing surface of the lens to be substantially uniform during operation of the apparatus;
the front side of the lens, providing the downward facing surface when the LED lighting apparatus is installed in the opening in the ceiling, is essentially flush with the front facing edge of the at least one sidewall of the housing; and
the downward facing surface of the lens is surrounded by the front facing edge of the at least one sidewall of the housing.

37. The apparatus of claim 36, wherein the front side of the lens is coplanar with the front facing edge of the at least one sidewall of the housing.

38. The apparatus of claim 36, wherein the lens is flat.

39. The apparatus of claim 36, wherein the front side of the lens is plane-parallel to the back side of the lens.

40. The apparatus of claim 36, wherein:
the at least one sidewall is perpendicular to the downward facing surface.

41. The apparatus of claim 36, wherein:
a first spacing of the plurality of the LEDs on the LED board facilitates generating the substantially uniform light at the downward facing surface.

42. The apparatus of claim 41, wherein:
a second spacing between the LED board and the lens further facilitates generating the substantially uniform light at the downward facing surface.

43. The apparatus of claim 36, wherein:
the LED board is circular;
the plurality of LEDs are arranged on the LED board as a plurality of concentric rings;
at least a first ring of the plurality of concentric rings comprises a first plurality of LEDs;
respective LEDs of the first plurality of LEDs are spaced substantially evenly around the first ring of the plurality of concentric rings;
each ring of the plurality of concentric rings comprises a different group of the plurality of LEDs; and
respective LEDs of each different group are spaced substantially evenly around a corresponding ring of the plurality of concentric rings.

* * * * *